United States Patent [19]

Sieradski

[11] Patent Number: 4,478,210
[45] Date of Patent: Oct. 23, 1984

[54] SOLAR HEATING SYSTEM

[76] Inventor: Leonard M. Sieradski, 2698 Country Club Dr., Petoskey, Mich. 49770

[21] Appl. No.: 30,351

[22] Filed: Apr. 16, 1979

[51] Int. Cl.³ .............................................. F24D 3/02
[52] U.S. Cl. .................................... 126/418; 126/429; 126/450
[58] Field of Search ............... 126/427, 430, 417, 418, 126/422, 450

[56] References Cited

U.S. PATENT DOCUMENTS

| | | | |
|---|---|---|---|
| 2,680,437 | 6/1954 | Miller | 126/417 |
| 2,680,565 | 6/1954 | Lof | 126/417 |
| 2,998,005 | 8/1961 | Johnston | 126/417 |
| 3,102,532 | 9/1963 | Shoemaker | 126/417 |
| 3,254,702 | 6/1966 | Thomason | 126/427 |
| 3,919,998 | 11/1975 | Parker | 126/417 |
| 3,937,208 | 2/1976 | Katz et al. | 126/450 |
| 3,996,918 | 12/1976 | Quick | 126/432 |
| 3,997,108 | 12/1976 | Mason | 126/432 |
| 4,019,495 | 4/1977 | Frazier et al. | 126/427 |
| 4,029,081 | 6/1977 | Strong | 126/427 |
| 4,051,999 | 10/1977 | Granger et al. | 126/427 |
| 4,054,124 | 10/1977 | Knoos | 126/427 |
| 4,059,226 | 11/1977 | Atkinson | 126/400 |
| 4,073,282 | 2/1978 | Schriefer, Jr. | 126/441 |
| 4,086,909 | 5/1978 | Lyon et al. | 126/417 |
| 4,098,262 | 7/1978 | Peters | 126/444 |
| 4,099,338 | 7/1978 | Mullin et al. | 126/449 |
| 4,099,513 | 6/1978 | Skrivseth | 126/449 |
| 4,112,921 | 9/1978 | McCracken | 126/452 |
| 4,114,595 | 9/1978 | Barker | 126/450 |
| 4,114,597 | 9/1978 | Erb | 126/448 |
| 4,172,442 | 10/1979 | Boblitz | 126/422 |
| 4,207,868 | 6/1980 | Peterson | 126/449 |
| 4,210,129 | 7/1980 | O'Hanlon | 126/449 |
| 4,265,222 | 5/1981 | Kapany et al. | 165/485 |

FOREIGN PATENT DOCUMENTS

| | | | |
|---|---|---|---|
| 2620976 | 10/1977 | Fed. Rep. of Germany | 126/417 |
| 2628442 | 1/1978 | Fed. Rep. of Germany | 126/417 |
| 2632373 | 1/1978 | Fed. Rep. of Germany | 126/450 |
| 2351364 | 12/1977 | France | 126/417 |
| 2399627 | 3/1979 | France | 126/450 |

Primary Examiner—Albert J. Makay
Assistant Examiner—Henry Bennett
Attorney, Agent, or Firm—Barnes, Kisselle, Raisch, Choate, Whittemore & Hulbert

[57] ABSTRACT

A self-cooling solar forced air heating collector module, and method of constructing a plurality of the same in modularized array from standarized components, for a solar heating system. The collector has an inner heating compartment beneath an inner glazing, and an outer heating compartment between the inner glazing and an outer glazing. A forced air inlet duct enters the collector bottom surface and communicates directly only with the outer compartment at a given location longitudinally of the collector. An always-open passage effects air flow communication from the outer to the inner compartment, at one longitudinal end thereof remote from the inlet duct. A sole outlet duct extends through the bottom surface and communicates directly only with said inner compartment in the vicinity of the inlet duct. A black body absorber comprising an air-permeable single layer screen extends within the inner compartment such that the forced air flows along and in the same direction on both sides of the screen. The collector is oriented in operation for solar incidence transverse to the glazings with its lengthwise dimension horizontal and its width dimension tilted at an angle between 10° through 90° from horizontal. Upon cessation of forced air flow via the ducts, whereupon a stagnation condition occurs in the collector, the air trapped therein automatically circulates within the collector and to and from the compartments via the always-open passage in response to solar-incidence-induced convection currents, thereby producing a self-cooling action.

51 Claims, 28 Drawing Figures

MODE 1 - COLLECTOR HEAT MODE

MODE 2 - HEAT FROM STORAGE MODE
MODE 3 - AUXILIARY HEATING MODE

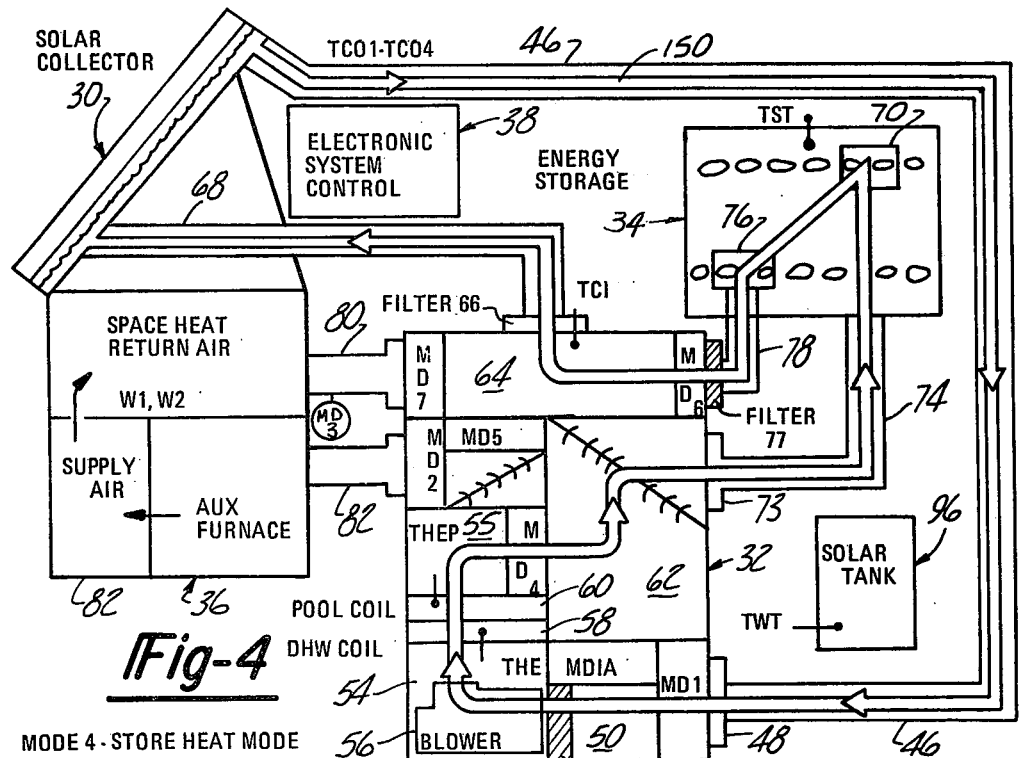
Fig-4  MODE 4 - STORE HEAT MODE
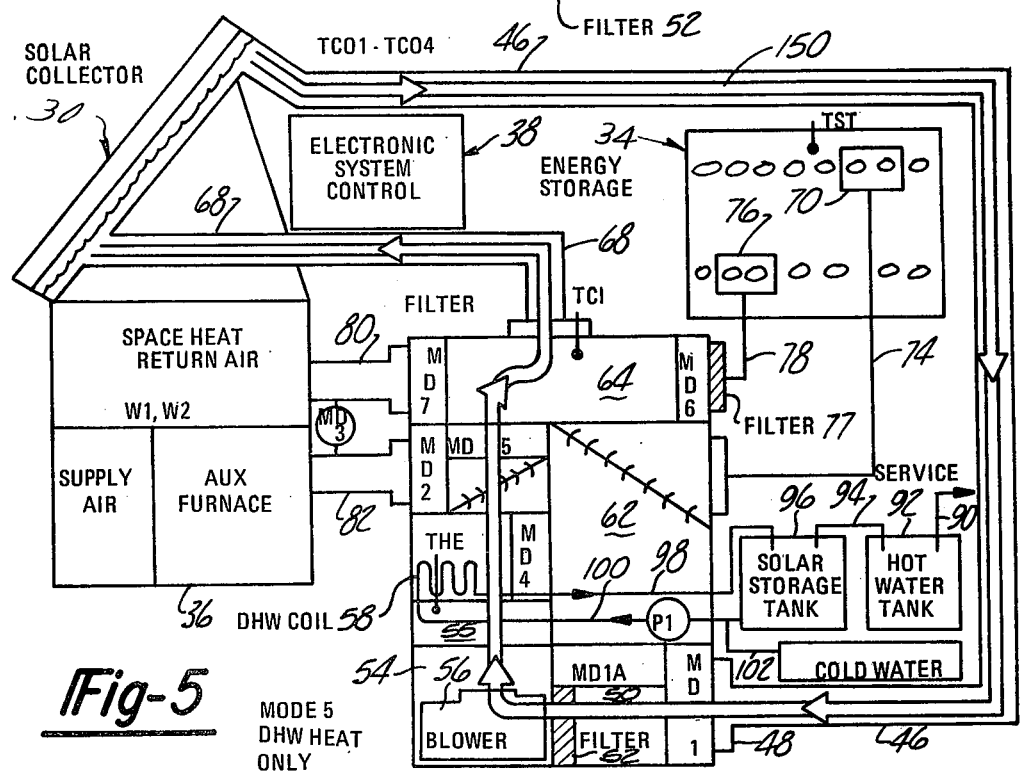
Fig-5  MODE 5 DHW HEAT ONLY

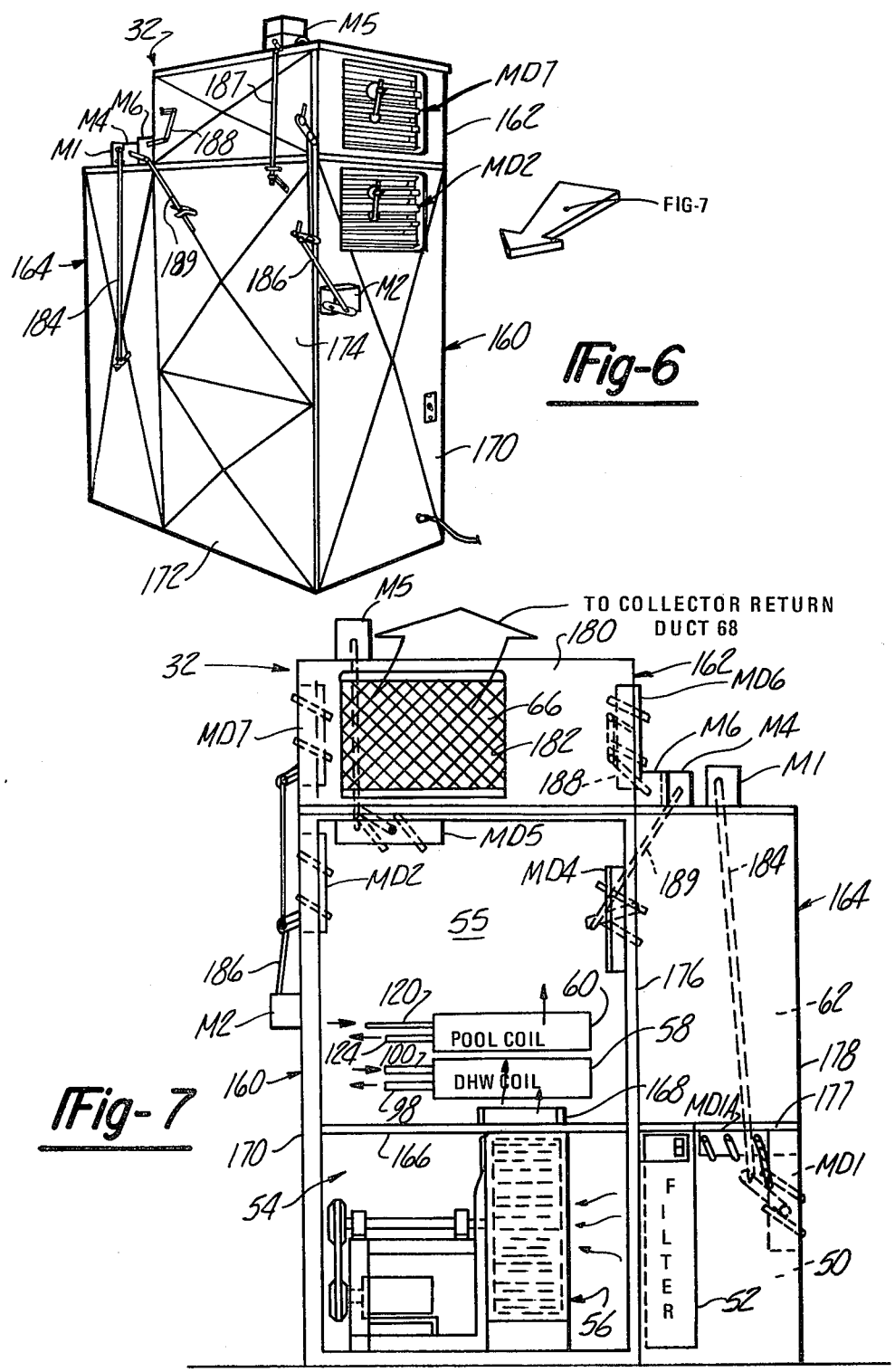

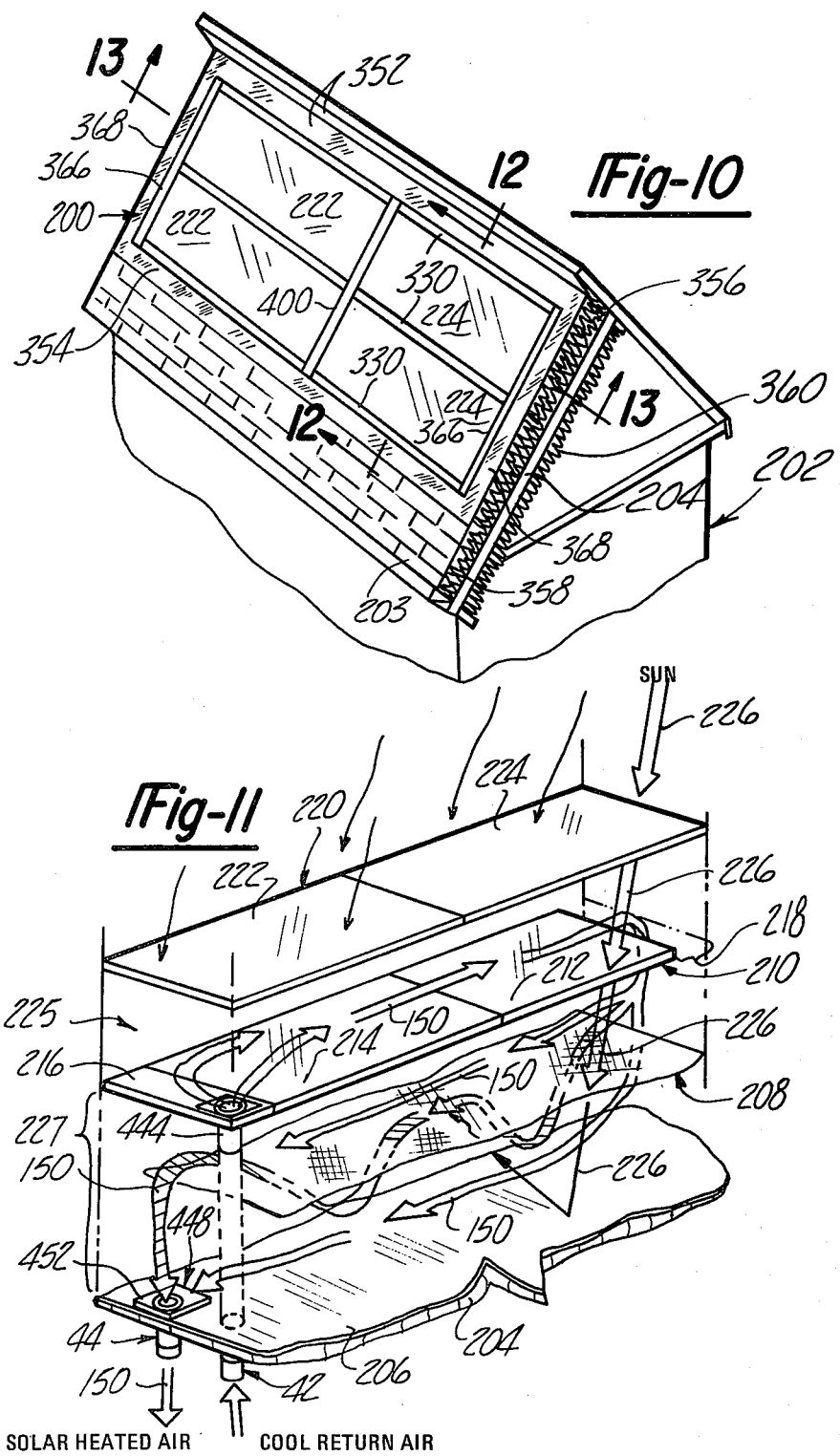

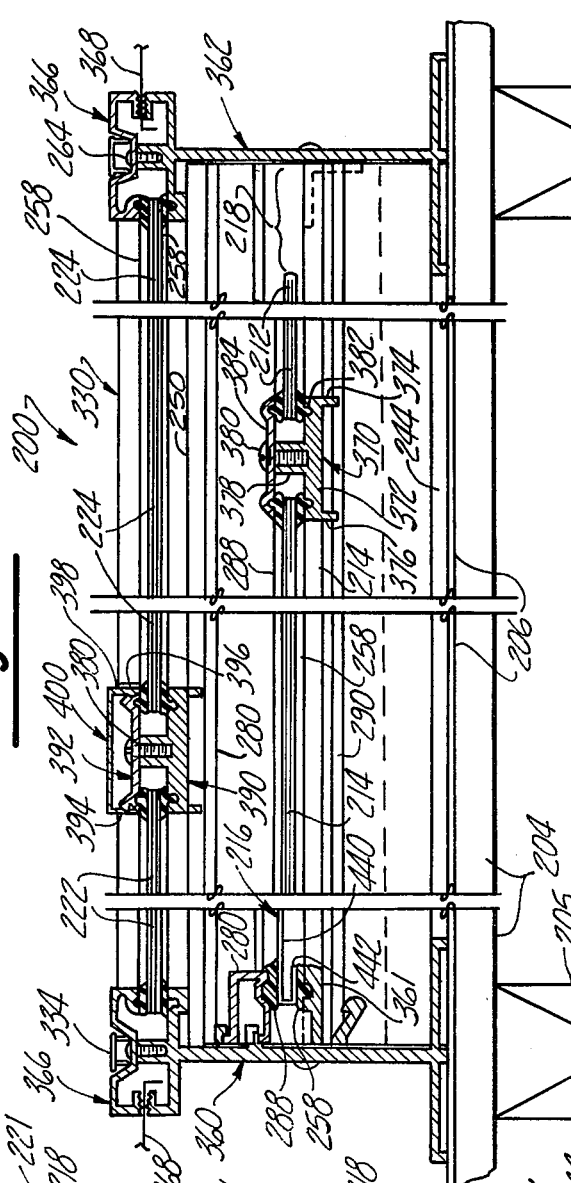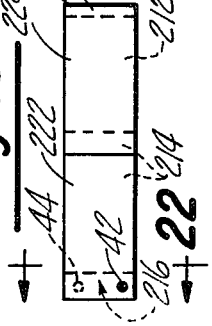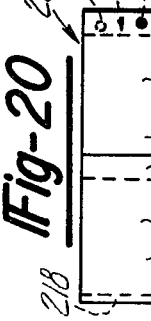

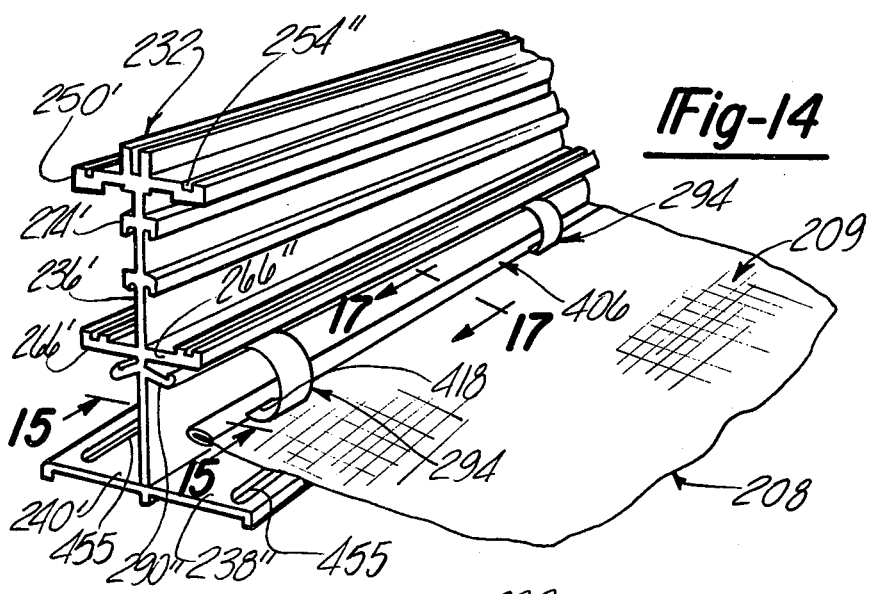
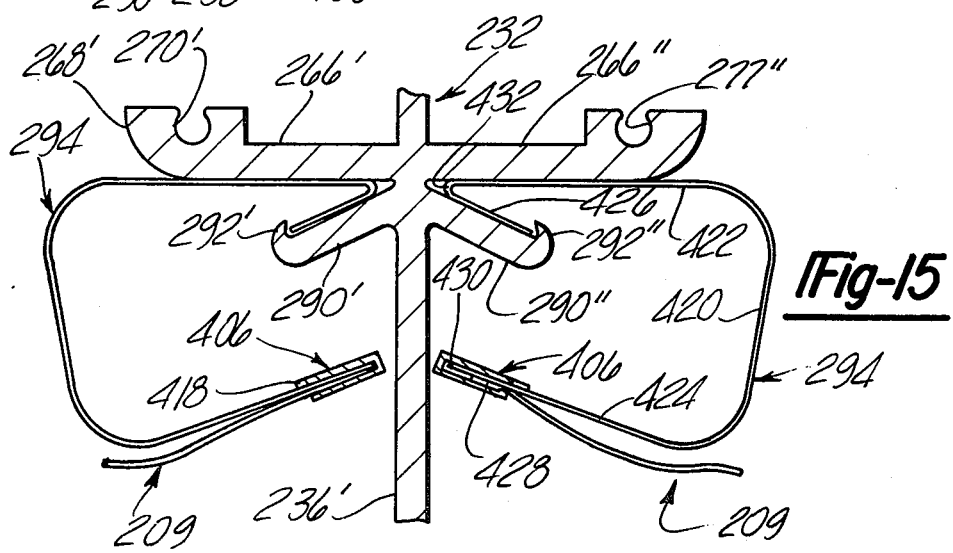
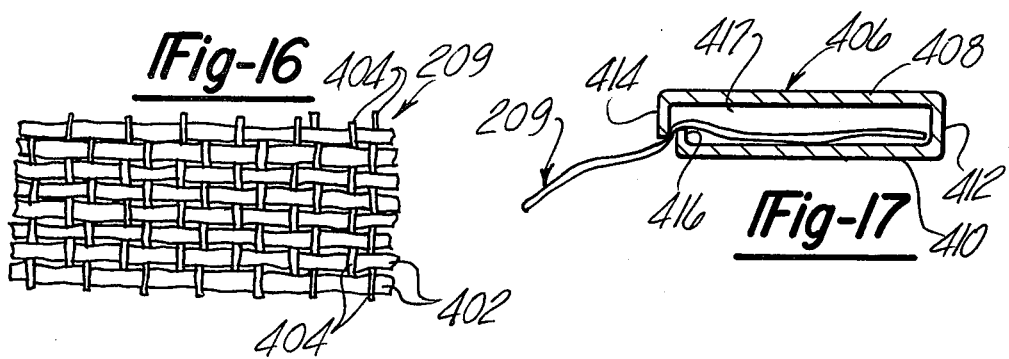

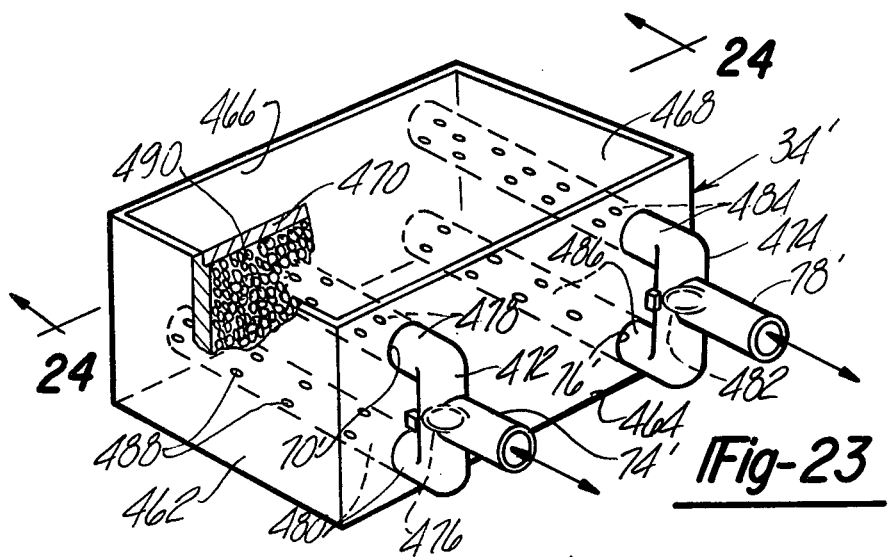
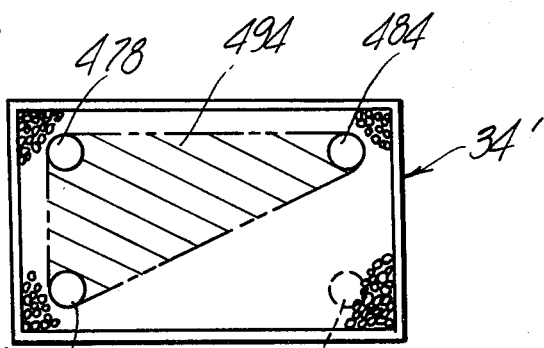
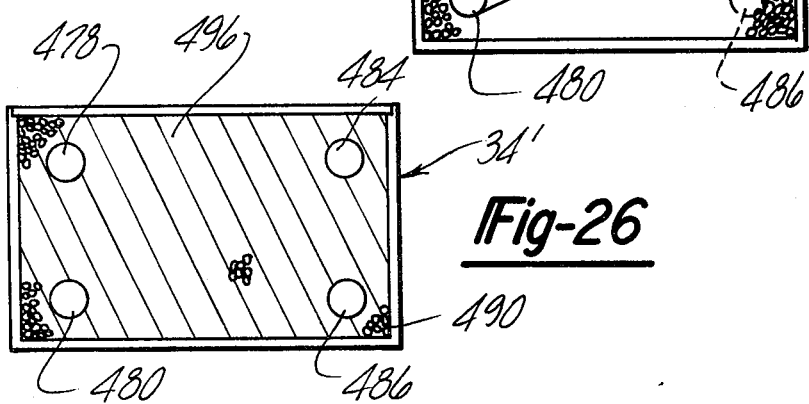

SOLAR HEATING SYSTEM

The present invention relates to an improved solar heating system, and subsystems and components employed therein, and particularly to solar heating systems using air as the primary heat transfer medium, and to a method of constructing such a system.

Commonly known solar heating systems utilize a large area heat collector for absorbing the heat from solar radiation for transfer to a transfer medium, whether it is water or other liquids, or air or gas. In such systems, a large surface area heat absorber is necessary for effective absorption of sufficient solar radiation. A cool transfer fluid is passed from one edge of the heat absorber surface to the opposite edge to heat the transfer fluid.

The heated transfer fluid is then passed to a storage system or for immediate use in space and/or water heating. Where air is used as a transfer medium, a dull black surface has heretofore been exposed to the sun, under a transparent (at least to the major portions of solar radiation) cover. In some cases, the heat absorbing surface is spaced from an underlying insulation medium, and air is blown between the surface and the insulation medium; or in other cases, the air may be blown over and/or under the heat absorption surface. In the usual installation, the heat absorbing assembly is mounted on the roof of a structure, such as a house, building or the like, and is mounted at a slope, so as to provide as large an absorption area as possible, and preferably normal to the angle of solar radiation. As a mechanism to maintain the surface at exactly right angles to the solar radiation during all day and at all seasons to extremely expensive, such units are normally mounted at a slope which is a compromise between the high and low points of the sun at mid-day of the various seasons. Where air is the transfer medium, a substantial volume of air is normally used to transfer the heat, and for economy, it is moved along one, or at the most, a few conduits to and from the heat collector surface and the storage area. The cool air is preferably distributed, through a manifold system, in a generally uniform flow across the large area of the collector, and after being solar heated the air is collected in a hot air manifold and then transported to the heat storage area or the area of use.

The construction of such large area collectors presents many problems; and heretofore it has been quite expensive to provide a collector large enough to satisfy the requirements of the particular building. Furthermore, such units have been generally custom designed and custom built for the particular installation.

According to the present invention, there is provided a solar heating system embodying improvements in the solar collector as well as in the cooperative air handling system, components and controls and associated heat storage using an air transfer medium capable of achieving, among other things, the following objects:

1. Capability of transportation of collector from manufacturer to job site at low or zero freight damage.
2. Fast, low-cost, reliable collector installation, and manufacturable at relatively low cost using mass production techniques.
3. Collector design allows design versatility for roof and vertical wall installations.
4. Collector produces useful heat at high efficiency at high collector output temperature even in northern latitude climates (maximum BTU/$).
5. Collector design minimizes internal temperatures during stagnation (no blower flow) conditions.
6. Heat generated by solar collector surfaces does not penetrate to overheat house.
7. Rain, snow, sleet do not penetrate collector to damage rooms below.
8. All code required loads produced by normal weather conditions are carried by collector and glazing system.
9. Generation of toxic or noxious odors by the collector or heating system is significantly reduced or eliminated.
10. Collector and constituent glazing system reduce safety and health hazards.
11. Collector and system are capable of preheating domestic hot water and/or swimming pool water (indoors) with no risk of freezing in northern latitude climates.
12. Collector and system are especially designed for northern climates but also perform in most U.S. climate zones for optimum national marketability.
13. System operates automatically and provides solar heat directly from collector, stores heat during zero demand periods, and allows use of stored heat during night or low sun conditions.
14. Systems and components interface with conventional building techniques and materials to form an architecturally attractive appearance.
15. Capability of collector to withstand stresses imposed by thermal cycling and resultant expansions.
16. Collector and system designed to meet HUD, ASHRAE and other agency standards to allow maximum marketability.
17. An air handler is provided which is an automatic self-contained insulated unit designed to provide at least four basic solar system modes as follows: (1) collector heat to house; (2) heating house from storage; (3) auxiliary conventional heating; and (4) store solar heat.
18. The air handler contains all the necessary dampers, damper motors, blowers, filters and electrical control connections and has the capability for optional electrostatic air cleaners and domestic hot water and/or swimming pool water preheat coils.
19. The air handler provides quick connection to the collector, auxiliary furnace, storage and house return air ducts by means of flexible duct connectors suitably marked for installation ease or with fiber glass (rigid) duct board, with which the duct flanges are also compatible.
20. Air handler duct work and damper control system eliminates the need for a second blower to distribute air in the conventional backup heating system and enables the conventional auxiliary furnace to be replaced by a smaller, less expensive duct heater.
21. The solar system controller, or logic module, provides electrical interface requirements between all control inputs and control outputs so as to maximize solar usage and maintain auxiliary system operation.
22. The heat storage component of the solar heating system provides a high degree of flexibility in utilization of various volumes of the heat storage to enhance the flexibility and overall efficiency of the solar heating system.

Among the features of the solar heating system of the invention are the provision of a modular solar collector construction in which the major glass and metal components of the collector are constructed as separate items to enable on-site manufacturing of the collector, thereby avoiding excessive freight charges involved with pre-assembled collectors. The collector embodies a framework made principally of aluminum extrusions which can be shipped at low cost under the going freight charges for aluminum. The collector also embodies glass glazing panels which can be shipped as crated glass, and thus freight charges fall under the billing category of glass. Little or no freight damage is encountered due to the separation of the glass and metal components of the collector of the system.

Another feature is the manner in which the collector design facilitates on-site installation. The collector employs a back panel consisting of aluminum flashing material to provide a waterproof roof. Horizontally disposed aluminum extrusions in two basic rail configurations (head/sill and intermediate) and in two basic lengths (16 and 24 feet) are fastened with hex head lag screws with guns to provide fast, easy installation. These extrusions are capable of spanning an array of roof rafters horizontally spaced apart up to four feet center-to-center. A lightweight, fast-response black body snap locks into the extrusion rails with stainless steel, low-thermal contact springs. Pre-machined slots in the horizontal aluminum extrusions accept inner vertical aluminum extrusions with gaskets for glazing support. The innermost of the dual glass lites in each collector are side-slipped into position. Upper cap extrusions, outer glazing and outer horizontal and vertical glass retainer cap extrusions are bolted in place. Decorative bolt head covers are snap-locked into position. Perimeter insulation is positioned and perimeter flashing is attached to the outer flashing flanges of the perimeter extrusions and suitably affixed to the adjacent roof surface. The result is a neat, more water-tight solar collector glazing system which blends in architecturally with the roof either in a "flush-with-the-shingles" manner or above the shingles, as required. In either case, an internal water-weep system and collector back panel provide added insurance as against water penetration into the collector and/or roof substructure.

A further feature of the collector of the solar system of the invention is its design versatility. The collector components are provided in a modularized system using two module sizes, 4 ft.×16 ft., and 4 ft.×24 ft. The smaller aluminum extrusion length module (16 feet) uses two outer 4×8 ft. glass panels and the longer (24 feet) uses three outer 4×8 ft. glass panels. These open-ended modules can be installed horizontally in series in various configurations tp form collector arrays graduated in 8 foot increments preferably ranging in length from 16 feet to 96 feet. Arrays having a length greater than 96 feet are also feasible, but blower horsepower must be correspondingly increased. Each horizontal module row is 4 feet wide and possesses only a single inlet and warm air outlet duct for each module row. Additional module rows can be added vertically to form a roof or wall module collector array having a height dimension graduated in 4 foot increments ranging in height from 4 feet to 24 feet simply by adding another aluminum intermediate extrusion rail row and glass panel set for each additional module row. Multiple arrays larger than 24 feet vertical can be constructed by providing a thermal expansion break and beginning another sill extrusion row for the next uphill array adjacent to the last head extrusion row. Flashing is used to connect and bridge the break between adjacent superposed arrays.

The position of the air ducts in each module row can be on the left end, right end or in the center of the array. Manifold ducts connect module rows, thereby reducing the number of ducts to two, and these form the supply and return lines to the air handler of the solar heating system of the invention. The minimization of ducts eliminates unnecessary static pressure drops, roof or wall penetrations and accompanying leaks, and allows the installation of the collector system over a cathedral ceiling with no ducts visible from the room below. The insulated ducts can be hidden above a closet or wall storage cabinet or can be internal to the ceiling above the insulation layer.

Still another feature of the invention is the high efficiency of the solar collector resulting from the combination of an extremely low mass black foraminous absorber plate, unique flow path and internal ducting feature. During operation, the collector absorbs heat as a single glazed collector by means of a middle glazing serving as a partial absorber and collector-air heat transfer surface, (each glazing's solar transmission equals 91 percent), and prevents heat escape through the outer glazing or light as a double glazed collector. With the series air flow path, first across the space between the outer and inner lights and then back between the inner light and roof flashing, the heat loss through the outer glazing lights is significantly reduced, even to the extent that the outer glazing lights feel cool to the touch of the hand even if the collector outlet is delivering air at 220° F. (with an inlet temperature of 70° F.) at a flow rate of two standard cubic feet per minute per square foot of collector area. Thus the collector demonstrates high thermal efficiency at high temperature output even for low incident solar radiation.

A still further feature of the invention is a collector design providing a minimum stagnation temperature. The collector is operable to reject heat as a single glazed unit so as to provide collector cooling during stagnation conditions, whereas it prevents heat losses as a double glazed unit during normal operation. This feature provides a self-regulating or self-cooling effect during periods of stagnation (no blower flow). This minimizes the internal temperature to about 100° F. cooler than that attainable in conventional average air collectors subjected to comparable incident solar radiation.

Yet another feature of the invention is the elimination of house overheating. The reflective aluminum back panel reflects about 90% of the heat radiated by the collector absorber plate during system operation. To control conduction of heat downward into the roof, six inches of insulation may be provided beneath the roof sheathing to prevent excessive temperatures from building up in the attic or cathedral ceiling, thereby preventing the house from overheating. In a cathedral ceiling installation 12 to 15 inches of insulation can be installed in a floor-truss type of roof, thereby eliminating unnecessary house heat buildup.

An additional feature of the collector of the invention is the unique glazing system embodied therein. The collector utilizes a horizontal and vertical aluminum extrusion framework and EPDM rubber gasket glazing system incorporating a water-weep gutter system which virtually eliminates wind-driven rain, snow and sleet from penetrating the collector system.

Yet another feature is the high strength of the collector construction of the invention. The normal code load requirement of 50 pounds per square foot horizontal loading is readily met by the glazing and support extrusion system of the invention. The glass itself can withstand up to 90 pounds per square foot uniform horizontal loading, while the extrusion system supporting the glass can withstand even greater loads.

A still further feature of the invention is the minimization of organic materials such as fiberglass glazing, wood, plastic or phenolics in the collector construction, particularly in the large surface area components. Instead, the collector is constructed entirely of aluminum, stainless steel, glass, EPDM gasketing and Delrin or Teflon washers, thus greatly reducing or eliminating offensive toxic or noxious outgassing or odor from being generated or transferred in the solar heating system because, unlike the aforementioned organic materials, the inorganic materials of the collector are not subject to the problem of outgassing of odorous volatile components even under high temperature conditions.

Another feature is the reduction in safety and health hazards provided by the collector and heating system of the invention. Glazing safety is assured by the use of a curtain-wall glazing concept. The provision of aluminum and glass for the major components of the collector modules assures that no health hazard exists. The air handler of the system enables optional installation of an electrostatic air precipitator for ultimate air purity.

Another feature of the invention is the capability of the solar heating system to provide domestic hot water preheating with zero risk of freezing. The air handler of the system may be provided with an optional copper and finned coil assembly located therein which is activated by an automatic system control to preheat water and deliver it by means of a circulating pump to a water storage tank. This tank is connected in series with a hot water heater (preferably gas fired) to provide the necessary backup heat. The coil assembly is located in the air handler in a heated space and is therefore not subject to any risk of freezing due to malfunction or lack of power, even in northern climates. Preferably, the air handler of the system is located in a basement utility room of a home also provided with an auxiliary gas or electric hot air furnace and insulated to solar heating specification, thus providing adequate protection against the domestic hot water system encountering freezing conditions.

Other objects, features and advantages of the solar heating system and components thereof of the present invention will become apparent from the following detailed description taken in conjunction with the accompanying drawings wherein:

FIG. 1 is a simplified semi-schematic elevational view of a solar heating system and components constructed in accordance with one exemplary but preferred embodiment of the invention wherein the solar heating system is equipped to supply solar energy to heat the house living space as well as to preheat water being fed to the domestic hot water tank via a water storage tank and to heat water being supplied to a swimming pool located adjacent or inside the house.

FIGS. 2, 3, 4 and 5 are schematic block and flow diagrams of the solar heating system of FIG. 1, respectively, illustrating the air flow paths through the system in the collector heat mode (FIG. 2), heat from storage mode (FIG. 3), store heat mode (FIG. 4), and domestic hot water heat only (FIG. 5).

FIG. 6 is a perspective view of an air handler unit constructed in accordance with the invention.

FIG. 7 is a front side elevational view of the air handling unit viewed in the direction of the arrow in FIG. 6 with certain of the side panels removed to illustrate interior components.

FIG. 10 is a fragmentary perspective semi-schematic view of a house roof construction having an array consisting of two solar heat collecting roof modules in accordance with the invention installed thereon in a "flush-with-the-shingle" arrangement.

FIG. 11 is a fragmentary exploded perspective semi-schematic view of a single solar collector module constructed in accordance with the invention to illustrate the functioning of the same with respect to air flow and heat absorption therein, the aluminum extrusion framework members being omitted to facilitate illustration.

FIG. 13 is a vertical cross-sectional view in fragmented and compacted form taken on the line 13—13 of FIG. 10.

FIG. 14 is a fragmentary perspective view of the center or intermediate horizontal extrusion rail illustrating a portion of the black body screen suspended thereon with the stainless steel clips featured in the present invention.

FIG. 15 is a vertical cross-sectional view taken on line 15—15 of FIG. 14 but greatly enlarged thereover and showing only a portion thereof.

FIG. 16 is a fragmentary plan view of a portion of the aluminum woven matting employed in the black body of the invention.

FIG. 17 is a fragmentary vertical cross-sectional view taken on line 17—17 of FIG. 14 and greatly enlarged thereover.

FIGS. 18, 19 and 20 are simplified schematic plan views of an individual solar collector module of the invention illustrating, respectively, left-hand end, center and right-hand end ducting to and from the collector.

FIG. 21 is a simplified plan view of an array of collector modules arranged in vertical stacks of three horizontal 64 foot rows illustrating the use of center ducting in such an array.

FIG. 22 is an end elevational view of the cold air inlet duct and plate as well as hot air outlet duct and plate as viewed looking on the line 22—22 of FIG. 18.

FIG. 23 is a simplified perspective view of a rock storage bin and associated ducting constructed in accordance with one exemplary but preferred embodiment of the invention.

FIGS. 24, 25 and 26 are vertical cross-sectional views taken on the same sectional line 24—24 of FIG. 23 but illustrating three different heat storage and heat recovery air flow patterns obtainable by controlling the flow through the dual inlet and outlet duct work associated with the rock storage bin.

Figure 27:
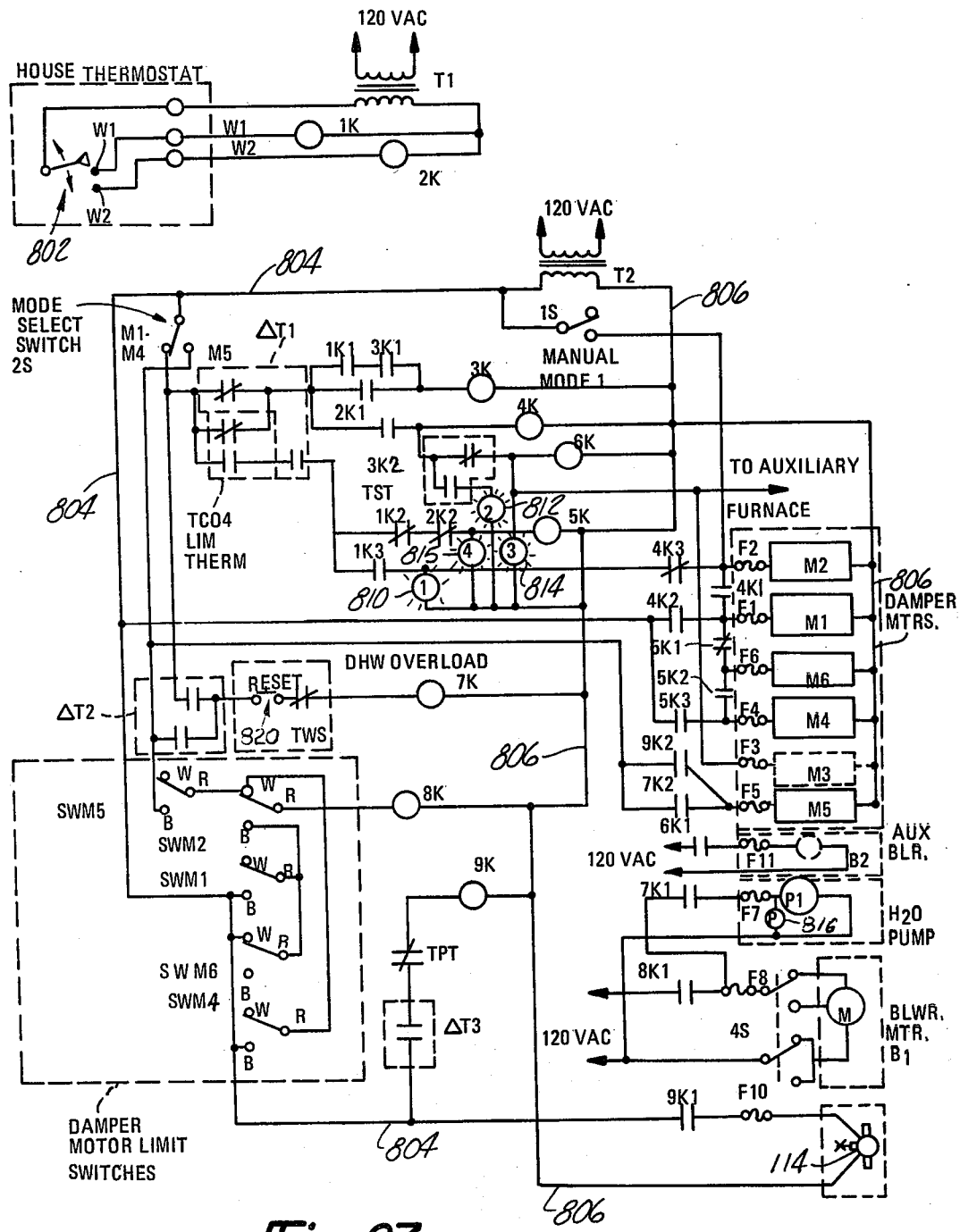
Figure 28:
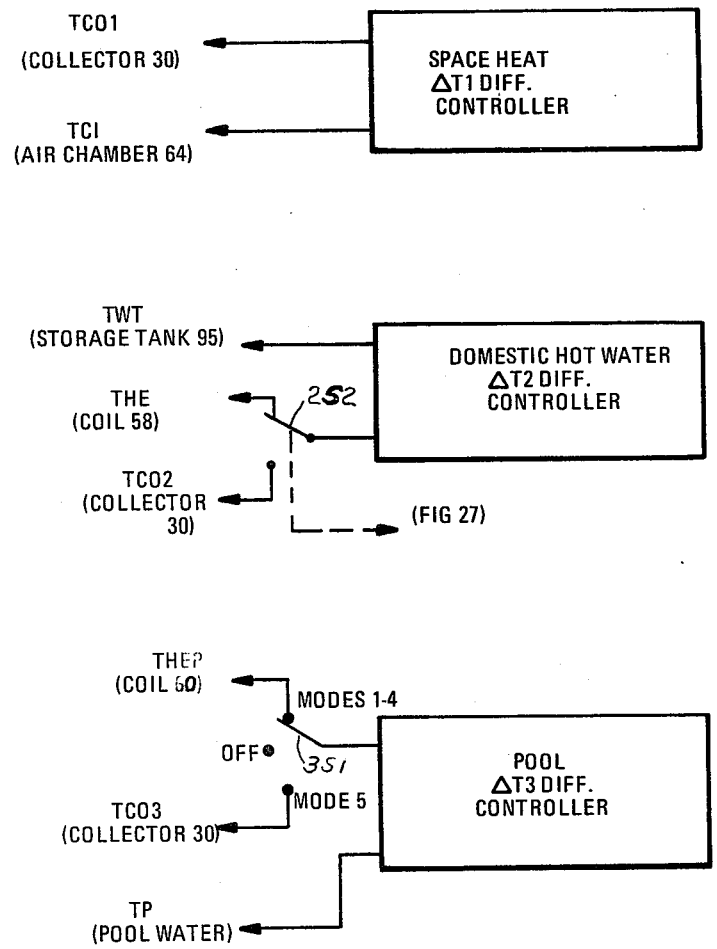

FIGS. 27 and 28 together are an electrical schematic diagram of the control circuit of the solar heating system of the invention.

SOLAR HEATING SYSTEM

Figure 1:
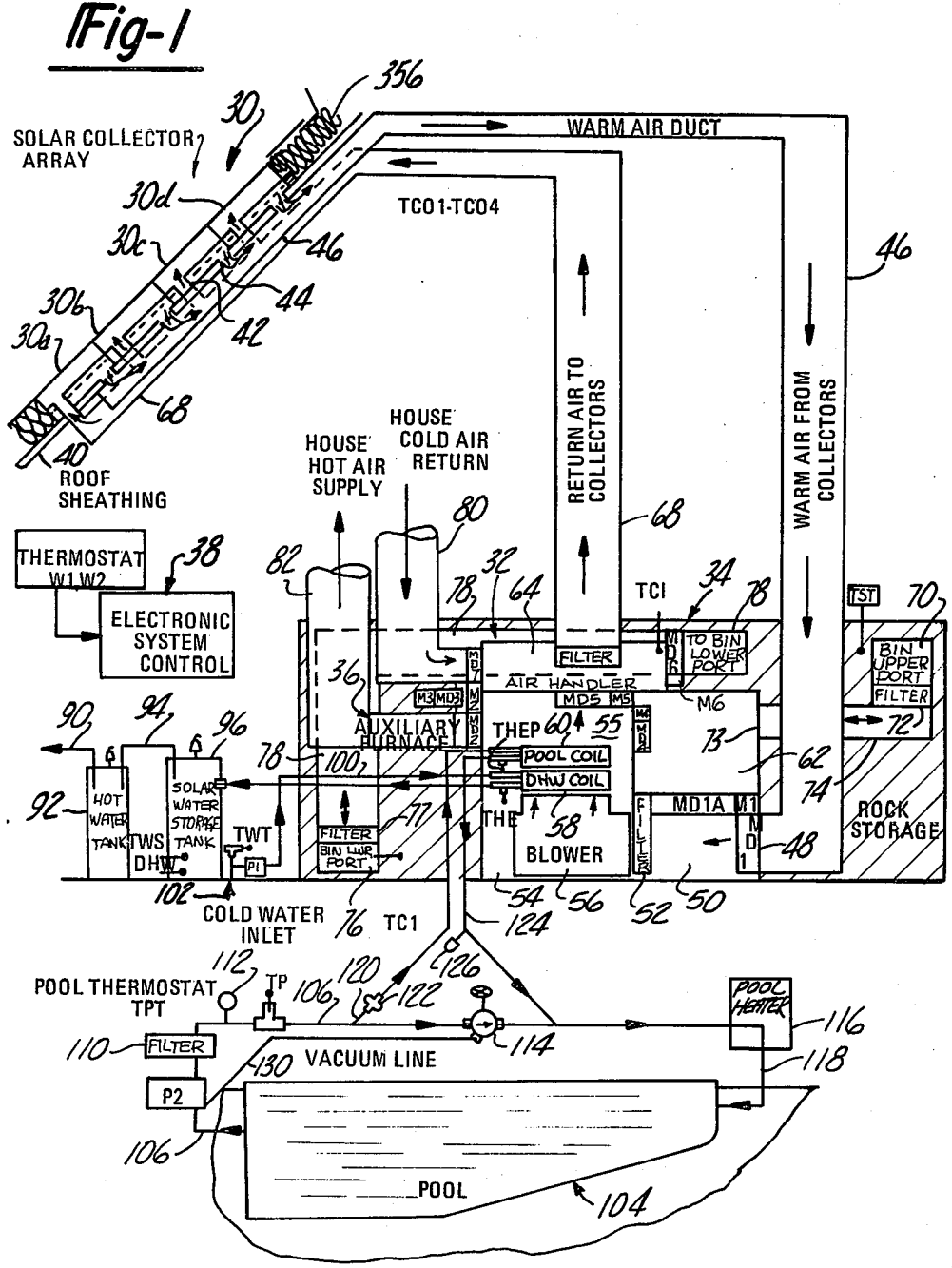

FIG. 1 schematically illustrates a solar heating system of the invention arranged in one exemplary but preferred embodiment thereof to provide house space heating, preheating of water for a domestic hot water heater and auxiliary heating of swimming pool water. The major components of the solar heating system of this embodiment include a roof-mounted, air-type solar collector array 30, an air handler 32, an energy storage bin 34, an auxiliary gas or oil-fired hot air furnace 36 and an electronic control system 38 operatively coupled to the blower energizing circuit and motor damper control circuits of the air handler to provide at least four basic modes of operation plus optional additional modes, as will be described in more detail hereinafter.

The solar collector array 30 illustrated in FIG. 1 is a modularized "4-7C" array, meaning four horizontal rows of collector modules 30a, 30b, 30c and 30d, each 56 feet in length and stacked four high vertically along a sloping roof 40 to provide 896 square feet of collector area. Each horizontal module row requires only a single cold air supply duct 42 and a single warm air return duct 44 to penetrate the roof sheathing 40, these supply and return ducts being shown in FIG. 22 and described in more detail hereinafter. Each warm air return duct 44 is connected to a main warm air duct 46 which extends from the solar collector array 30 interiorly of the house to be heated downwardly through an inlet port 48 of air handler 42.

Port 48 leads to a first chamber 50 of the air handler, air flow through port 48 being controlled by a motorized damper MD1 operated by a motor M1. Chamber 50 communicates via an air filter 52 with a blower compartment 54 containing a motor-driven centrifugal blower 56 having its inlet oriented to draw air from chamber 50. The outlet of blower 56 is oriented vertically upwardly to discharge solar heated air past a domestic hot water heat exchange coil 58 and a superposed swimming pool water heat exchange coil 60. Air handler 32 has another chasmber 62 which communicates with chamber 50 via motorized damper MD1A also controlled by motor M1, and which also communicates with chamber 54 via a motorized damper MD4 controlled by a motor M4. Optionally, air handler 32 has an upper plenum chamber 64 which communicates with blower chamber 54 via motorized damper MD5 controlled by a motor M5. Chamber 64 communicates via a filter 66 with a main cool air return duct 68 which extends through the house and communicates with the respective cold air return ducts 42 leading into solar collector array 30. The energy storage 34, which is preferably of the rock bin type, has an upper port 70 connected via a filter 72 with a duct 74 which in turn is connected at its other end to a port 73 leading to chamber 62. Rock storage 34 also has a lower port 76 which is connected via a filter 77 and a duct 78 to plenum 64 via a motorized damper MD6 controlled by a motor M6.

The conventional cold air return ducts of the house communicate with a main house return air duct 80 which leads to plenum 64 via a motorized damper MD7 operated by motor M2. Blower chamber 54 also communicates via a motorized damper MD2, operated by motor M2, with the inlet to auxiliary furnace 36. The outlet of furnace 36 communicates with the main house hot air supply duct 82, which in turn leads to the conventional house hot air supply duct system (not shown).

In the system of FIG. 1, hot water is supplied to the hot water lines of the house plumbing system (not shown) via a hot water supply line 90 connected to the output of a gas fired water heater 92, preferably a fast recovery type of 40 gallon capacity. The water inlet of heater 92 is connected via a conduit 94 to the outlet of a water storage tank 96, which may be a Rheem Solaraide water storage tank of 120 gallon capacity. The inlet of tank 96 is connected via a line 98 to the outlet of coil 58, and the inlet of coil 58 is connected via line 100 with the outlet of a water pump P1. The inlet of pump P1 is connected to the main cold water supply line 102 leading to the house plumbing system.

The system of FIG. 1 is also adapted to supply heat energy to a swimming pool 104 equipped with a conventional pool water handling system including a water outlet line 106, circulating pump P2, pool filter 110 and pool thermostat (TPT) 112. Water line 106 is connected through a bypass valve 114 to the inlet of a conventional pool heater 116 having an outlet connected via a line 118 to pool 104. To supplement pool water heating with solar energy, a bypass pool water loop is provided comprising a water line 120 connected at one end to line 106 downstream of a pool water temperature sensor TP and provided with a solenoid valve 122. The other end of line 120 connects to the inlet of coil 60, the outlet of coil 60 being connected via a line 124 back into line 106 downstream of bypass valve 114. A relief valve 126 is provided in line 124, and pump 108 is connected via a vacuum line 130 to valve 114.

The solar heating system is automatically operated by the electronic control system 38, described in more detail hereinafter with reference to the logic diagram of FIGS. 27 and 28 which provides all electrical interface requirements between all control inputs, power inputs and control outputs of the solar heating system. In general, the control system 38 provides automatic, user selectable temperature control of the house space to be heated. System 38 controls the active collection, distribution and storage of solar energy as required by a conventional two-stage house thermostat control W1, W2. A typical thermostatic control for this purpose may comprise a commercially available Model T872C1003 thermostat and a Model Q672B1004 sub-base manufactured by Honeywell Corp. of Minneapolis, Minn. A system 38 also controls the solar air moving blower 56 which in turn provides both collector air movement and house supply air movement. The control system also includes a shut-down mode during transitions between solar operating loads. Control system 38 monitors the air temperature in the house, in collector 30, in storge bin 34, collector return air in duct 68, bin return air in duct 78, house return air in duct 80, as well as water temperature at the outlet of DHW coil 58, at the outlet of pool heating coil 60, return water temperature of storage tank 96 and return water to pool 104. Control system 38 selects one of four winter operating modes and an additional fifth mode for domestic hot water heating only, and provides appropriate outputs to maximize solar usage and yet control auxiliary back-up system operation.

Figure 2:
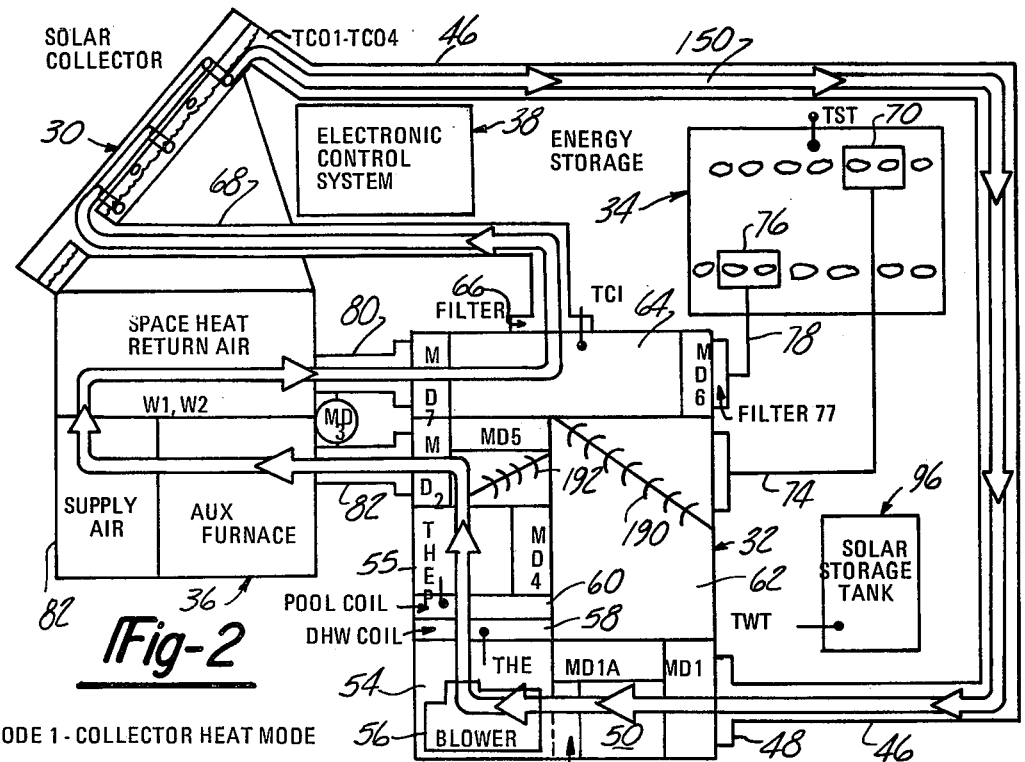
Figure 3:
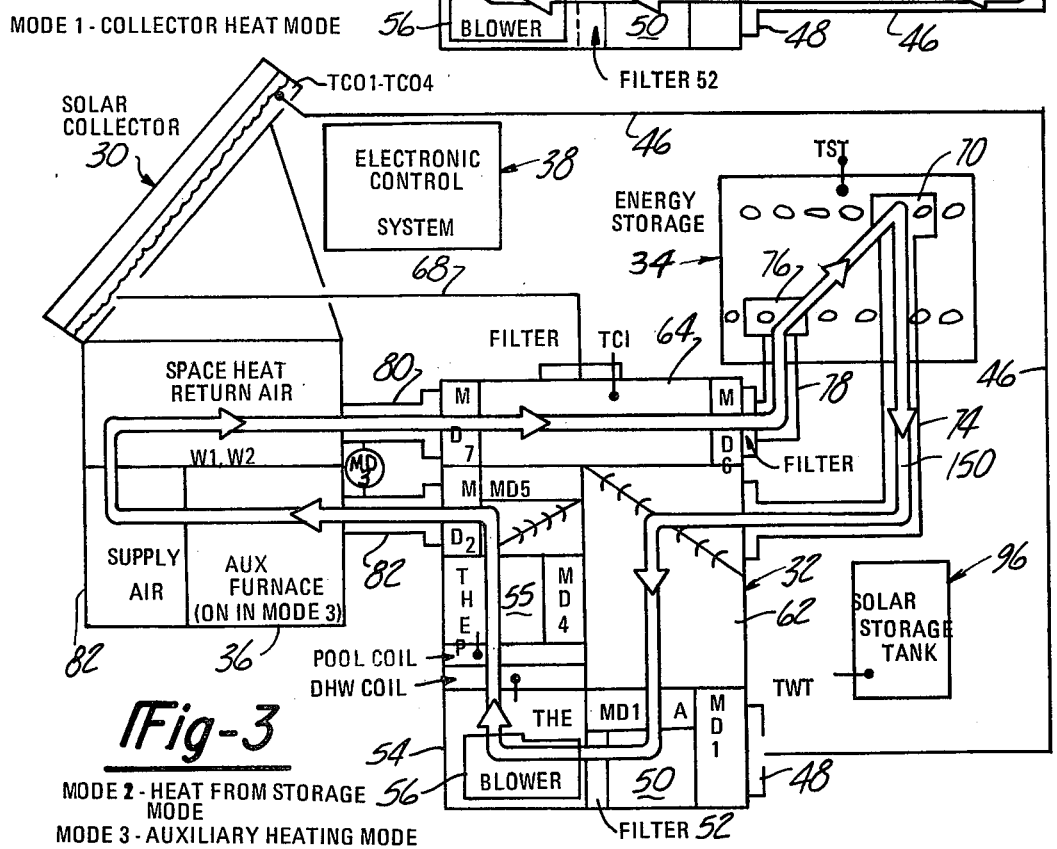
Figure 9:
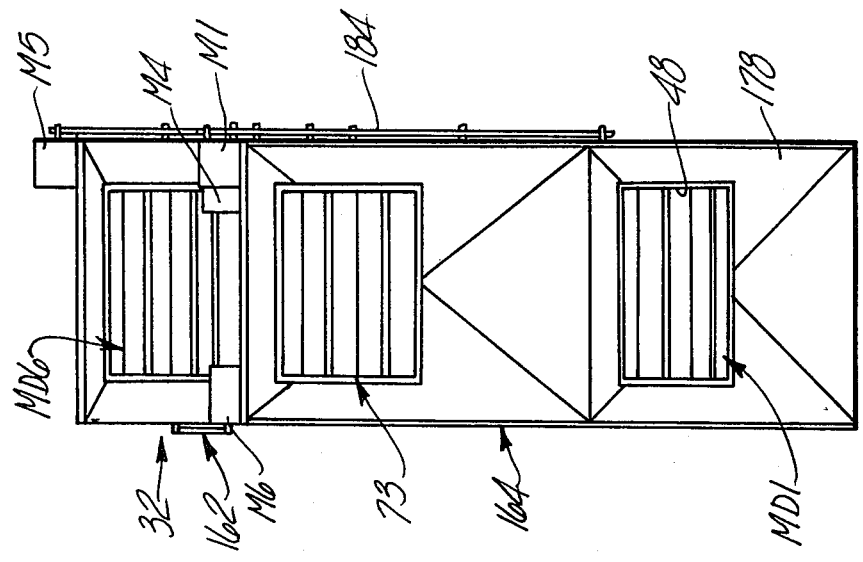
FIGS. 8 and 9 are end elevational views of the air handling unit, respectively, illustrating the left and right hand ends of the unit as seen in FIG. 7.
Figure 8:
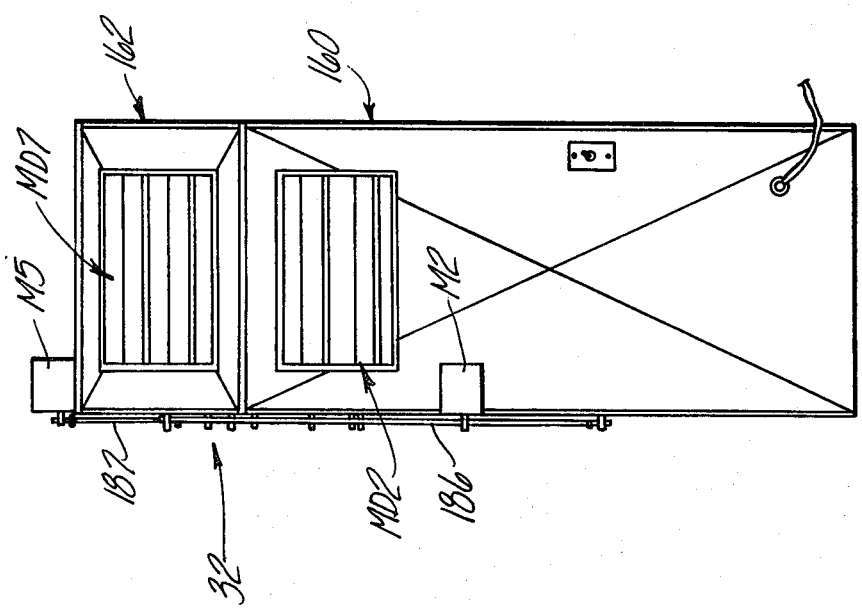

The aforementioned four winter operating modes are illustrated schematically in FIGS. 2 through 4, and the summer water heating mode in FIG. 5. Referring to FIG. 2, the "collector heat" mode (Mode 1) is illustrated with the heat transfer fluid (air) flow path indicated by the arrow-bar path 150. When the building or house thermostat W1,W2 calls for heat and collector 30 is hot, the automatic system control 38 directs solar heated air 150, normally ranging in temperature between 110° to 160° F., from the outlet of collector 30 via duct 46 into the system and house space to be heated. This air flow is controlled by the air handler 32 with its motorized dampers positioned to direct air flow 150 as illustrated in FIG. 2. The cool return air from the building space being heated is returned via duct 68 to the solar collector 30. In this collector heat mode, the motorized dampers of the air handler 32 are positioned by control system 38 as follows: MD1 is open, MD1A is closed, blower 56 is on, MD4 is closed, MD5 is closed, MD2 is open, MD7 is open and MD6 is closed.

Referring to FIG. 3, when the house or building thermostat W1,W2 calls for heat and no useful solar energy is available from collector 30, the automatic system control 38 causes building return air to pass through the heat energy storage vault 34. In this "Heat-From-Storage" mode (Mode 2), the air flow 150 becomes heated during its passage through the rock storage bin, the air preferably entering at the lower bin port 76 and exiting at the upper bin port 70, and being directed by air handler 32 to the building space to be heated. Auxiliary furnace 36 is turned on automatically by system 38 for additional heat to the building space as may be required (Mode 3). Thus, in both the heat-from-storage mode (Mode 2) and the auxiliary heating mode (Mode 3), of required, system 38 conditions the air handler 32 such that the motorized dampers are set as follows: MD1 is closed, MD1A is open, MD4 is closed, MD5 is closed, MD2 is open, MD7 is open, and MD6 is open.

Referring to FIG. 4, illustrating the "store heat" mode (Mode 4), when collector 30 is hot and space heat demand is satisfied, the automatic system control 38 directs air into the heat storage load 34 through upper port 7. Heat is absorbed in the rock storage bin and cool air is returned from the lower bin port 76 through the air handler 32 back to the collector via duct 68. In this heat storing mode, control system 38 conditions the motorized dampers of air handler 32 as follows: MD1 is open, MD1A is closed, MD4 is open, MD2, MD5 and MD7 are closed, and MD6 is open.

It will be noted that in all four of the aforementioned winter operational modes, heated air is traversing the domestic hot water coil 58 as well as the pool coil 60, and the domestic hot water supplied to the house is being preheated and stored in tank 96. Also, under user control, the swimming pool water is being heated entirely or in part through the water circuit connected to the pool coil 60.

Referring to FIG. 5, even when there is no heating requirement for the building or house space associated with the solar heating system of the invention, the solar energy available to the system via solar collector 30 is utilized to preheat domestic hot water and/or swimming pool water. In this "DHW/Pool heat only" mode (Mode 5), solar heated air from collector 30 is circulated by blower 56 via duct 46 into the air handler and back to the collector via return duct 68. Control system 38 thus conditions the air handler motorized dampers as follows: MD1 is open, MD1A is closed, MD4 is closed, MD5 is open, and MD2, MD7 and MD6 are closed.

AIR HANDLER

The construction of one embodiment of an air handler 32 employed in the solar heating system of the invention is illustrated in FIGS. 6 through 9. In general, air handler 32 as illustrated is constructed in a manner similar to conventional hot air furnaces in that it consists of a generally rectangular framework covered by suitable sheet metal panels which are removably attached to the framework to provide access to the various compartments of the air handler. Thus, air handler 32 may take the form of three rectangular boxes, the largest being a rectangular housing 160 on top of which is mounted a smaller horizontally disposed box 162. At the right-hand end of box 160 (as viewed in FIG. 7) there is another narrower upright box 164.

The main housing 160 has a horizontal partition 166 dividing the interior space of the housing into a lower compartment 54 which houses the blower 56 and associated conventional electric motor, belt drive and drive shaft, and an upper interior compartment 55 which houses the domestic hot water preheat coil 58 and the swimming pool supplemental heating coil 60. The outlet shroud 168 of blower 56 protrudes through partition 166 so as to direct the airstream exiting from the blower through the finned tubular coils of exchangers 58 and 60. The left-hand side of housing box 160 is covered by a sheet metal side panel 170, and the motorized damper MD2 is mounted in a suitable opening provided near the upper end of panel 170 (FIGS. 6 and 7). The rear of housing 160 is covered by lower and upper panels 172 and 174 (FIG. 6) which are removable to provide access to compartments 54 and 55, respectively. The front of housing 160 has similar removable panels (not shown), the same being removed in FIG. 7 so as to illustrate the interior of these compartments. At the right-hand side of housing 160 (as viewed in FIG. 7), the framework is left uncovered and a partition wall is provided by the left side wall 176 of housing 164.

Housing 164 is also a closed hollow interior upright box having a horizontal partition 177 extending horizontally thereacross and dividing the same into the interior compartments 50 and 62 described previously. Motorized damper MD1 is mounted in the lower portion of the end wall 178 of housing 160, and motorized damper MD1A is mounted on the horizontal partition 177 to control air flow between compartments 50 and 62. Motorized dmper MD4 is mounted in side wall 176 to control air flow communication between compartments 55 and 62.

The plenum housing 162 is likewise of hollow metal construction covered by sheet metal panels. Motorized dampers MD6 and MD7 are mounted, respectively in the opposite right and left-hand end walls of housing 162 (as viewed in FIG. 7), and the front wall 180 of housing 162 has an outlet 182 to which duct 68 is attached, and filter 56 is mounted across opening 182. In some cases it may be desirable to provide an additional normally open damper controlling opening 182 and operated by motor M1 to operate in phase with damper MD1. Motorized damper MD5 is mounted to the top wall of housing 160 and controls air flow communication between chamber 55 and the interior of plenum 162.

The motorized dampers MD1, MD1A, MD2, MD4, MD5, MD6 and MD7 are of conventional louvred construction and are commercially available under the brand name "Honeywell Low Leakage Dampers", Model Number D640A9082. Likewise, the control motors M1, M2, M4, M5 and M6 for these dampers are commercially available under the brand name "Honeywell Low Leakage Dampers", Model Number M836A1042. As seen in FIGS. 6 through 9, the control motors are mounted exteriorly of air handler 32 for ease of access and maintenance, as well as improved reliability due to reduction of operating temperature. Motor M1 is mounted on the top of housing 164 and is coupled by suitable linkage 184 to operate to dampers MD1 and MD1A in 180° out of phase relationship such that when MD1 is closed, MD1A is open, and vice versa. Motor M2 is mounted on panel 170 and coupled by a suitable linkage 186 to dampers MD2 and MD7 to operate these dampers in unison so that both are closed or open at the same time. Dampers MD5 and MD6 are respectively operated by motors M5 an M6 mounted on top of housings 164 and 162 and respectively coupled via linkages 187 and 188 to the associated dampers. Motor M4 is mounted on top of housing 164 and coupled via linkage 189 to damper MD4. Preferably, the external walls of the air handler are insulated with a one-inch layer of high temperature insulation (not shown). Also, as indicated in FIGS. 2 through 5, the upper compartment 55 of main housing 160 may be provided with air-directing vanes 190 and 192 oriented to promote a nonturbulent change in direction of air flow through these respective compartments, as will be well understood in the art.

SOLAR COLLECTOR

The modularized solar collector system and structure of the present invention is illustrated in more detail in FIGS. 10 through 22. In accordance with the present invention, the solar collector comprises an assembly of a minimum number of basic components manufactured in standard incremental sizes to provide a modularized system intended for on-site installation and assembly of solar collector arrays varying widely in square footage and heating capacity.

In one exemplary but preferred and working embodiment, the smallest module is 4 feet wide (high) by 16 feet long to provide a plan area of 64 square feet, while the longest module row measures 4 feet by 96 feet long (384 square feet). Any number of horizontal module rows, such as rows 30a, 30b, 30c and 30d of collector array 30 can be joined in a vertical or uphill stack-up to form larger arrays, such as a 24 foot high by 96 foot long (2304 square feet) array. Large arrays can be added side by side on commercial buildings for ventilation make-up air or for space heating. The modularized collector system of the invention requires only a single supply duct and a single return duct to penetrate the mounting surface for each single horizontally extending module row. Each horizontal row is provided with a supply and return duct manifold (FIG. 22) which can be positioned at either end, a left end (west end) installation being shown in FIG. 18 and a right end (east end) installation in FIG. 20, or at the center of the module row as illustrated in FIGS. 19 and 21. This allows great architectural design flexibility. The system can be mounted at various tilt angles to accommodate various roof slopes or can be mounted with the width dimension upright on a vertical wall (not shown). Such vertical installations are especially suited to northern latitutde sites where winter sun angles and horizontal ground reflections provide improved system performance and reduced summer stagnation temperatures. Also, with such a vertical installation, a suitable roof overhang or other shade can be added to minimize or eliminate unnecessary solar exposure during the summertime.

Referring to FIG. 10, a typical collector array 200 is illustrated mounted on the sloping roof of a building 202, with the right hand edge of the roof structure shown open to expose insulation layers. In this arrangement, the collector array 200 is supported by the plywood roof sheathing 204. In the roof area not covered by the collector array, the roof shingles 203 are laid on a built-up roof section elevated from sheathing 204 such that the shingles are flush with the outer lites of collector 200. The collector array 200 of FIG. 10 is a modularized assembly of the smallest incremental horizontal length, namely 16 feet, and consists of two horizontal rows of such 4'×16' modules to provide an 8 foot vertical (slant height) dimension and an area of 128 square feet.

Referring to FIG. 11, which is an exploded perspective view of the glass panels, black body, underlying roof sheathing and ducting of a single module of collector 200, it will be noted that the roof sheathing 204 is first covered with a reflective back panel consisting of aluminum flashing material 206 preferably laid in rows as overlapping strips in shingle fashion to provide a waterproof roof covering over the sheathing 204. Internally of the collector module, the next component above the flashing 206 is a perforate black body 208, described in more detail hereinafter in connection with FIGS. 14–17, which is suspended approximately $1\frac{1}{8}''$ over flashing 206 so as to extend parallel therewith from side to side and end to end within the interior of the collector module. Superimposed another $1\frac{3}{8}''$ over black body 208 is an inner light array 210. In the 4'×16' module size shown array 210 consists of a transparent glass panel 212 of nominal 4'×6' dimension, a similar transparent glass panel 214 of nominal 4'×8' dimension and an end manifold panel 216 nominally measuring 4'×$1\frac{1}{2}'$. The horizontal dimensional stack-up is thus $15\frac{1}{2}$ feet, leaving approximately a one-half foot air gap 218 at the end of the unit opposite from the manifold 216. The outermost glazing array 220 of this smallest solar collector module consists of two 8'×4' (nominal) glass panels 222 and 224 laid end to end and superimposed over inner light array 210 in parallel relation therewith and spaced therefrom by a distance of approximately 2 3/16". The sides and ends of the collector module are closed by a metal framework made up principally of aluminum extrusions, described in detail hereinafter, so as to provide an air tight and substantially water tight rectangular box having a major horizontal dimension and minor vertical or "uphill" dimension, the minimum ratio of which in a preferred working embodiment is 4:1. The outer lights 222 and 224 are preferably constructed of tempered glass of 3/16" thickness, such as that commercially available under the trademark "SUNADEX" and having a relatively high solar transmission coefficient. The inner lights 214 and 212 are preferably made from a less expensive tempered ASG glass of similar thickness. Black body 208 comprises a perforate aluminum woven mesh screen 209 (FIG. 16) of extremely low mass having a black absorptive coating on both sides of the same and preferably comprising a two component epoxy primer and a two component urethane black paint, such as that commercially available under the trademark "ENERSORB A".

The air flow duct work to the solar collector module consists of the cool return air duct 42 which includes a duct fitment 444 extending through the roof sheathing 204, aluminum roof flashing 206, black body 208 and thence up through the manifold plate 216 so as to communicate with the outer solar chamber 225 formed between the inner lite array 210 and outer lite array 220. Blower-forced air flow 150, indicated by the solid arrows in FIG. 11, flows lengthwise of, and within, outer chamber 225 to the opposite end thereof where it then exits chamber 225 and travels downwardly via air gap 218 and into the lower or inner solar chamber 227 formed between inner lite array 210 and flashing 206. The air flow then returns lengthwise of, and within, inner chamber 227 generally parallel to outer chamber 225, but with at least a portion of such inner chamber flow describing a sinuous somewhat random path alternating between the outer space defined between black body 208 and inner light array 210 and the inner space between black body 208 and flashing 206. This random sinuous flow back and forth through the black body is at least in part produced by the natural irregular, somewhat wavy contour assumed by the screen 209 when installed and suspended as described herein, as well as by the partial obstruction provided by the interior vertical struts 370, and by the unavoidable waviness of the flashing 206. When the air flow reaches the left hand end of the collector (as viewed in FIG. 11) the solar heated air exits via the warm air duct 44 which includes a duct fitment 448 communicating with the space between black body 208 and flashing 206.

The above-described solar collector module of the invention has been found to demonstrate a high thermal efficiency and high temperature output even for a low level of incident solar radiation (indicated by the broad band arrows 226 in FIG. 11). It is believed that the combination of the extremely low mass black body absorber 208 and unique low resistance air flow path wherein all of the incoming air first travels through the entire length of outer solar chamber 225 and then all returns beneath double glazing and travels the entire length of the inner solar chamber 227, plus the entrance and exit ducting of the air so as to sweep a relatively long, collector array (and preferably oriented with its longitudinal dimension generally horizontal), produces such extremely high efficiencies. Thus, during operation, the collector absorbs heat as a single glazed collector (transmission at normal solar incidence equals 91%) and yet heat escape from absorber 208 is prevented by the inner and outer glazing, the collector thus functioning in this respect as a double glazed collector. In a conventional collector about 85% of the total collector heat loss occurs through the outer glazing. In the collector of the invention, this loss is significantly reduced because heat conducted outwardly and convected upwardly through the inner light array 210 is picked up by the incoming air flowing between glazing arrays 210 and 220, thus preventing conduction to the outer lite array 220, and this entrained heat energy is returned by this air flow to the inner compartment 227. The cooling of the inner lite produced by the incoming air flow also reduces heat loss due to the reduction of heat radiation from the inner light. For example, in one working embodiment the heat loss reduction because of this effect was such that the outer glazing 220 felt cool to the hand's touch even with collector outlet 44 delivering air solar heated to 220° F. (with an inlet air temperature in duct 42 of 70° F.) at a flow rate of 2 standard cubic feet per minute per square foot of collector area.

In accordance with another feature of the invention, the above-described collector module is operable to provide a self-regulating or self-cooling effect during periods of stagnation (no blower flow). Due to the major collector dimension (length) being oriented horizontally, and the width dimension (nominally four feet) being oriented non-horizontally, i.e., somewhere between approximately 10° to 90° to the horizontal earth surface plane, a convection flow is produced internally of the collector which significantly drops the internal absorber region or chamber 227 temperature (for example) to about 100° F. cooler (when the width dimension is oriented at 45° to the horizontal) than that of existing air-type collectors during comparable incident solar radiation. During this mode the collector has been found to reject heat as a single glazed unit so as to provide self-cooling during stagnation condition. In this stagnation condition, an internal air flow cooling loop is induced by convection heating of the captive body of air within the collector. Because of the greater heat absorption capability within inner chamber 227, caused by the presence of black body 208, a temperature differential is created between chambers 227 and 225, causing an air flow along and beneath glazing array 210 which also migrates upwardly within chamber 227. This solar heated air then exists from chamber 227 via the highest elevation area of air gap 218, thus entering outer chamber 225, and thence traveling along and beneath the outer glazing 220. During this passage, heat is given up through glazing 220 to outside ambient air, thereby cooling the interior air and causing it to descend within chamber 225 at the end thereof remote from air gap 218. The air flow thus reverses direction and travels along the lower elevation portion of chamber 225, then flows through the lower elevation portion of gap 218 and into and along the lower elevation portion of chamber 227 until reaching the far end thereof to complete the internal air flow loop.

Another feature of the solar collector of the invention is elimination of the house overheating. During system operation the reflective aluminum back panel 206 reflects about 90% of the heat radiated by the collector absorber plate 208. In addition, preferably about 6" of insulation 360 (FIGS. 10 and 12) is provided beneath the roof sheathing 204 to prevent excessive temperatures from building up in the attic beneath the roof, thereby preventing the house from overheating. In a cathedral ceiling installation 12 to 15 inches of insulation can be installed on a floor truss type of roof, thereby eliminating unnecessary house heat buildup and also providing desirable insulation of internal house heat during off-collection periods.

The ease of installation and the design versatility of the solar collector component of the solar heating system of the invention is illustrated in more detail in FIGS. 12 through 17. In addition to the above-described inner and outer glass lites 210 and 220, black body 208 and manifold ducting 42,44 of a solar collector module of the invention, modularized aluminum components are provided consisting of framework members preferably formed as aluminum extrusions in standard sizes. The modular collector system of the invention preferably uses two basic length extrusion sizes; namely, sixteen feet and twenty-four feet. The smaller aluminum extrusion modules use two outer glass panels 222 (nominal size 4'×8', actual size 46¾"×94¾") and the longer module uses 3 outer glass lights 222 of the nominal 4'×8' size. The horizontal aluminum extrusions are provided in two shapes, one to serve as a so-called horizontal "head" beam 230 or as a "sill" beam 234, and the other as an "intermediate" beam 232. In a single collector module (only one horizontal row) only the sill beam 234 and head beam 230 are utilized to provide the main upper and lower horizontal side frame members of the module. When the collector array includes more than one horizontal row, as in array 30 of FIG. 1 or array 200 of FIGS. 10 and 12, one intermediate beam 232 is used as the horizontal frame member between each row, and thus only one intermediate 232 is employed in the two-row array 200 of FIGS. 10 and 12. Beams 230, 232 and 234 are generally of I-beam cross sectional contour, sill 234 and head 230 being identical and arranged in reversed or mirror-image relationship to each other.

Figure 12:
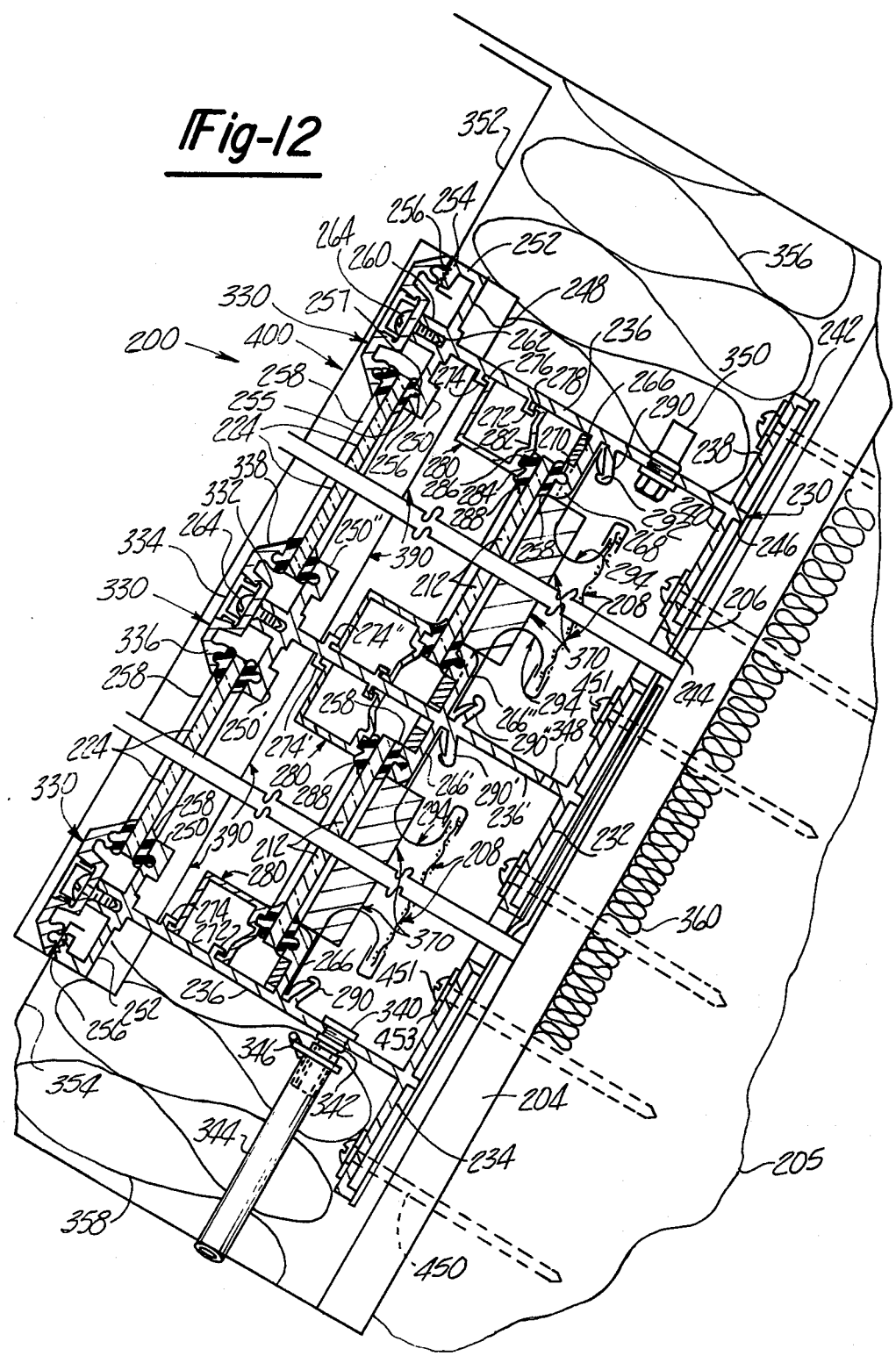
FIG. 12 is a vertical cross-sectional view in fragmented and compacted form taken on the line 12—12 of FIG. 10.

As best seen in FIG. 12, head beam 230 has a center web 236 with a pair of bottom mounting flanges 238 and 240 protruding laterally perpendicularly therefrom and terminating at downturned stiffening flanges 242 and 244 which are co-planar with an outer rib 246 formed as an integral extension of web 236. The upper portion of head beam 230 has a pair of smaller lateral exterior and interior flanges 248 and 250, respectively protruding perpendicularly from opposite sides of web 236. Exterior flange 248 has a secondary flange 252 extending upwardly parallel to web 236 and terminating in a return flange 254, the upper surface of which is provided with a series of longitudinally extending grooves 256. Interior flange 250 supports the outer light glazing and has a thickened outer edge section 255 formed with a re-entrant groove 256 in the upper surface thereof to receive a corresponding mounting rib 257 of a conventional weatherproof resilient glazing strip 258. The upper edge of 260 of web 236 is enlarged in thickness and has an upwardly opening center groove 262 for receiving self-tapping metal screws 264.

Beam 230 has an intermediate lateral flange 226 protruding perpendicularly from one side thereof for supporting the inner light glazing. Flange 266 has a thickened outer edge portion 268 also formed with a re-entrant groove 270 to receive the rib 256 of another weatherstrip 258. The upper inner side of web 236 of beam 230, between flanges 250 and 268, has a pair of longitudinally extending, vertically spaced hook flanges 272 and 274 of L-shape cross section. Flanges 272 and 274 thus provide downwardly facing grooves into which fit the upturned outer edge flanges 276 and 278 of a generally C-shaped inner glazing retainer channel 280. The bottom leg side of retainer 280 has an outwardly protruding rib portion 282 which cooperates with an adjacent rib extension 284 to define a downwardly facing re-entrant groove 286 therebetween for receiving the mounting rib of another conventional resilient wedge seal strip 288 of the type which can be rolled into place with a suitable roller installation tool.

Head beam 230 has another shorter and downwardly sloping back body mounting flange 290 projecting from the inner side of the web 236 between flanges 240 and 268 just beneath flange 268. The outer edge of flange 290 has an upturned edge 292 to form a retaining lip for a black body support clip 294 described in more detail in conjunction with FIGS. 14 and 15 hereinafter.

The sill beam 234 is identical to head beam 230 and thus need not be described in detail, it being understood that like reference numerals are given to corresponding portions of sill beam 234 as previously described in conjunction with head beam 230.

Similarly, intermediate beam 232 has most of the structure and configuration of head beam 230 except that the outer and inner glass light supporting flanges are duplicated on both sides of the center web of the beam. Hence, similar reference numerals are applied to corresponding parts and distinguished by prime and double prime suffixes respectively for left and right hand parts as viewed in FIG. 12.

Each of the horizontal framework beams 230, 232 and 234 of the collector has an upper cap aluminum extrusion 330 removably secured thereto by screws 264. Cap 330 has a drop center well portion 332 suitably drilled at spaced intervals with holes to receive screws 264 and in which the heads of screws 264 seat. The screw heads are covered by a light gauge aluminum head snap cover 334 of flexible C-channel configuration and having outward ribs at the edges of its legs adapted to snap into corresponding grooves in the drop center portion 332. Cap extrusions 330 have downwardly inclined arm portions 336 and 338 with longitudinally extending re-entrant grooves in the underside thereof designed to receive with a snap-in fit the corresponding mounting rib of the associated weather stripping 258.

Although the solar collector of the invention is essentially water-tight and weather-tight from outside atmospheric and inclement weather, due to the potential moisture penetration at the uphill facing portion of seal 258 underlying cap arm 338 the collector array is provided with a built-in water-weep system for draining such accumulated moisture out of the collector array. In addition, web 236 of beams 230 and 234 are provided with a water drain system including hollow drain spud fitting 340 which is inserted through a hole in the lower portion of web 236 and clamped in place by a nut 342. One end of a flexible drain tube 344 is slipped onto the sleeve end of fitting 340 and secured thereto by a spring clip 346. Preferably, the other outlet end of tube 344 has a rubber duck bill one way valve to allow water escape but prevent air infiltration via this water drainage route. Water drainage communication between collector rows is provided by suitable drain holes 348 provided in the web 236' of intermediate beam 232 or by irregular contact of the horizontal beams with the roof flashing 206. When the identical beam 230 is positioned to serve as a head beam 230, the drain holes provided in the web 236 thereof are closed by a suitable screw-plug fitting 350.

In the shingle-flush-with-outer-light roof mounting illustrated in FIGS. 10 and 12, the collector array at its upper and lower edges is provided with suitable conventional roof flashing strips 352 and 354, one edge of which extends between the associated shingle layer and the other edge of which is received between an associated beam flange 252 and cap 330. Conventional fiber glass insulation batting is arranged in layers 356, 358 adjacent the upper and lower outer edges of the collector array and another beneath the sheathing layer 360, as will be well understood in the art.

The remainder of the structural details of the aluminum framework of the collector array 200 is best seen in FIG. 13. Additional extrusions of nominal 4 foot incremental lengths are provided to form the vertical or uphill extending members of the aluminum framework. In particular, the left hand end of the collector array 200, as viewed in FIGS. 10 and 13, is provided with a so-called "manifold jamb" 360, and the right hand end of the collector array is provided with a "turn-around end jamb" 362. Jamb 360 may be essentially a duplicate of the head and sill beams 230 and 234 so as to utilize the same extrusion die but is cut to nominal 4, 8, 12, 16, 20 or 24 foot lengths instead of the 16 and 24 foot lengths mentioned previously in connection with the horizontal members. Thus, jamb 360 has the same outer and inner light supporting flanges extending off one side of the web of the beam, as well as the same retainer and black body supporting flanges as head 230 and sill 234. The turn-around end jamb 362 has the same flange construction of the upper and lower ends of its web but the intermediate flanges protruding off the side of the web are omitted. Jambs 360 and 362 are covered at their upper ends by cap strip extrusions 366 which have a slightly different configuration from caps 330 but which are functionally identical, the same being removably secured in place by cap screws 264. In place of cap extrusion 366, the jamb 360 and 362 can use the same cap extrusion 392 as used on the outer verticals 390. This alternative allows the use of the removable rubber gasket seal 258 instead of the silicone sealant coupling otherwise required to seal the flashing 368 between the associated jamb and cap 366. Likewise, the screw or bolt covers 334 are designed to snap into the drop center well of caps 366 similarly to caps 330. Again the conventional roof flashing strips 368 may be clamped and caulked with silicone sealant between the uppermost flanges of jambs 360 and 362 and the associated caps 366 to provide a weathertight transition between the end edges of the collector array 200 and the adjacent roofing. Where no need exists for the flashing pieces 368, the joint between cap 366 and the upper flanges of jambs 360 and 362 may be suitably sealed with a suitable mastic or sealant material, as will be well understood in the roofing art.

Interiorly of each collector module the end edges of longitudinally adjoining inner lights 212 and 214 are supported by an interior vertical strut 370 (FIG. 13), comprising an aluminum extrusion of generally C-channel configuration in cross section, having a center web 372 and a pair of downwardly extending end flanges 374 and 376. An upwardly protruding central rib 378 is provided with an upwardly facing central groove having extruded longitudinal threads machine screws 380. Longitudinally extending grooves 382 are provided in the upper surface of web 372 to receive the corresponding mounting ribs of the weather strips 258. Clamping action of the weather strips to the inner lights is obtained by mounting a cap extrusion 384 onto strut 370, cap 384 being centrally apertured via and extruded drill piloting groove to receive the mounting screws 380 in spaced relation therealong. Strut 370 is suitably notched at its opposite ends to rest upon the upper surfaces of the flanges 266 and 266' of the sill and intermediate beams 234 and 232 in the case of the lower row module of collector array 200. Similarly, in the next uphill row of the collector array, another interior strut 370 rests upon and spans between flanges 266" and 266 of the intermediate and head beams 232 and 230 respectively. It is to be understood that the flanges 266, 266' and 266" are also provided with corresponding notches in the upturned edges thereof to receive the notched outer ends of struts 370, with the upper surfaces of struts 370 and the upturned end edges 268 being flush in assembled relation (as best seen in FIG. 12). These interior vertical struts 370 when placed in assembled position serve to fix the horizontal extrusions (head 230, intermediate 232 or sill 234) at the designed 4' spacing, thereby acting as temporary positioning spacers to insure approximate spacing of the horizontal extrusions during assembly.

The vertical or uphill extending aluminum framework members also include outer vertical struts 390, similar in cross sectional configuration to struts 370, which span between sill 234 and intermediate beam 232 and rest upon the top notched ends of vertical web 236 near flange 274 and web 236' of intermediate 232 near flange 274 and fit between the notched flanges 250 and 250' thereof such that the upper surface of strut 390 is flush with the upper surface of flanges 250 and 250' of beams 234 and 232. In a two row array, outer vertical strut 390 spans between sill beam 234 and head beam 230 and is notched at its middle to fit into intermediate beam 232, resting upon the top of notched webs 236,236' and fitted between corresponding flanges 252, 250, 250', 250", 250 and 252 respectively, as best seen in FIG. 12. Outer vertical struts 390 are designed with close tolerances in their engagement notches to serve as precise spacing jig bars during lay up and securing of the horizontal intermediate and head beams 232 and 230. A cap extrusion 392 is mounted by machine screws 380 to strut 390 and is grooved on its under surface, similar to cap 384, to receive the mounting ribs of seal strips 258 which are thus clamped against the edges of outer lights 222 and 224 between strut 390 and cap 392. Cap 392 has another set of grooves 394 at its opposite outer side edges to receive corresponding ribs 396 extending internally of the side flanges 398 of a channel-shaped cover 400 so that the same may be snap fit and removably retained upon cap 392.

COLLECTOR BLACK BODY

The construction, assembly and mounting of the black body 208 employed in the solar collector of the invention is best seen in FIGS. 12, 14, 15 and 16. Referring to FIG. 16, black body 208 comprises a lightweight aluminum screen 209 with a non-selective Enersorb A black absorptive coating of 0.5 to 1.0 mil thickness on each of the top and bottom surfaces. Screen 209 consists of warp ribbons 402 and woof filaments 404 woven into a mesh having a coated open space area of 14% viewed in a direction perpendicular to the plane of the black body to provide a maximum first pass optical opacity of 86%. In one preferred exemplary embodiment, ribbons 402 were 0.062 inches wide and 0.005 inches thick, whereas filaments 404 consisted of aluminum wire of 0.011" diameter. The aluminum screen 209 is made up in strips having a nominal length dimension of 8 ft. and 12 ft. corresponding to the module beam length increments of 16 ft. and 24 ft. and having a width generally corresponding to the interior spacing between the facing surfaces of webs 236 and 236' of sill 234 and intermediate 232 or head 236, or approximately 47".

Alternatively to the aluminum mesh screen 209, and presently preferred thereover, is a black body 208 made of stainless steel ribbons and filaments woven in a manner similar to screen 209, or a perforated thin sheet of stainless steel, so as to provide an inexpensive absorber readily selective coated on both surfaces in a hot chemical bath treatment to greatly reduce infra-red emissivity and thereby improve solar performance.

Each longitudinal edge of screen 209 has permanently affixed thereto a roll-formed clamp strip 406 best seen in FIG. 17. Strip 406 preferably comprises sheet aluminum material rolled into a generally box configuration having parallel sides 408 and 410 and a bight portion 412. Side 408 is slightly wider than side 410 and has an inturned flange 414 adapted to overlap a flange 416 turned inwardly from the outer edge of side 410. An initially formed clamp strip 406 has the edges of flanges 414 and 416 laterally spaced apart so as to leave an access opening to the interior space 417 within molding 406, thereby allowing the aluminum screen 209 to be inserted through the opening and into space 417, following which the sides 408 and 410 are forced towards one another to bring the flanges 414 and 416 into overlapping relationship to thereby crimp screen 409 therebetween and thus attach the same to strip 406. Each of the edge clamp strips 406 is provided at equally spaced intervals therealong with cut out notches 418 (FIGS. 14 and 15) such that a portion of flange 414 is removed for a distance of 1" to permit insertion of spring clip 294 into each notch 418 of strip 406.

As best seen in FIG. 15, each spring clip 294 is a generally C-shape member preferably made from stainless spring steel and, for example, having a width of 15/16", a thickness of 0.012" and a length of 3.80". The stainless strip stock is formed to a configuration in its untensioned condition (shown in FIG. 15) so as to have a bight portion 420 and a pair of legs 422 and 424 extending from bight 420 so as to define an angle of 80° between each leg and the bight so that the legs converge toward one another. Upper leg 422 has a return bend portion 426 bent back upon leg 422 at an angle of 25° and having a length somewhat less than the distance between edge 292" of flange 290" and the junction of flange 290" with web 236". The outer edge of lower leg 424 of clip 294 has an intermediate portion thereof die cut and struck so as to provide a downwardly protruding resilient tang 428. The free edge of tang 428 is spaced from the outer free end 430 of leg 424 by a distance slightly less than the width dimension of interior space 417 of strip 406. End 430 is adapted to be inserted with a slip fit into the notch 418 of strip 406, and during such insertion tang 428 is cammed flush with leg 424 as the same slips past the flange 416 of strip 406. Once tank 428 clears flange 416, it springs back to its outwardly protruding position to form a retaining barb relative to flange 416 to thereby capture spring clip 294 permanently in strip 406.

Similarly, tang 426 of leg 422 is yieldably cammed toward leg 422 when the outer edge 432 of the leg 422 is inserted into the space between flange 266" and flange 290" of beam 232. Once end edge 432 is fully inserted into the position shown in FIG. 15, tang 426 snaps back to rest upon the upper surface of flange 290" and biases leg 422 upward against the undersurface of flange 266". It is to be understood that the strength of clip 294 is such that under the load of the installed black body 208 the leg 424 is stretched downwardly to approximately the stressed position thereof illustrated in FIG. 12. Similarly, the remaining spring clips of the spring clip array are snapped into the spaces between the associated intermediate flanges 266 and 266" and black body mounting flanges 290 and 290" of the mutually facing horizontal beams.

COLLECTOR DUCTWORK

The remaining structural components of the solar collector of the invention comprise the inlet air duct manifold plate 216 of the cool return air ductwork 42 and the fitment 448 of solar heated air outlet ductwork 44 described previsously. As illustrated schematically in FIGS. 18, 19 and 20, preferably two types of air inlet manifold assemblies are provided as selectable components in the overall system. One of these modules is a so-called "end feed" manifold assembly 216, which is used for left-hand end feed mode, as shown by way of the smallest module collector array 221 illustrated in FIG. 18, and also for a right-hand end feed mode, illustrated by the single module collector 221' of FIG. 20. Manifold assembly 216 comprises a panel 440 of sheet aluminum material the end and side edges of which are crimped under to form reinforcing edges 442. Alternatively, a solid sheet of aluminum, of 0.125" thickness, may be used for manifold 216, thereby eliminating the need for edge reinforcement. Panel 440 in the working example described herein has a width of 16¾" and a length of 46¾" and thus is adapted to span lengthwise between the webs 236 of sill 234 and head 230 in a single module collector array. The end edges of panel 216 rest upon the same glazing strip 258 which supports the adjacent inner light 214 (in the case of the left end feed of FIG. 18) such that the upper surface of panel 216 is flush with the adjacent surface of light 214 (see FIG. 13). The outer side edge of panel 440 is sealably resiliently clamped in position by an upper weather strip 288, 1/16" thicker than normal, held in position by a slip-in retainer 280 described previously.

The end feed manifold assembly 216 also includes a duct fitment 444 which consists of a length of cylindrical tubing 446 having outwardly rolled rib forms which serve as positioning stops for fitment 444 and manifold 216, with a serrated, bend-over-at-installation flange 448 at its upper end and a similar flange at its lower end. Panel 440 is provided with a circular hole into which the cylinder portion 446 slip fits, and flange 448 is hammer crimped over panel 440 at the time of installation. Similar crimping is accomplished at the bottom end of cylinder 446 to secure the inlet end to the associated underlying duct 68, by reaching through the cylinder 446 from the roof side.

The solar heated air outlet ductwork 44 is connected to the inner chamber 227 via a duct fitment 449, which also consists of a cylindrical tube 450 having a flange spot welded or crimped to a square panel 452. Panel 452 is adapted to rest upon and is sealed and fastened to the aluminum flashing 206 as illustrated in FIGS. 22 and 11. Alternatively, panel 453 can be omitted if an accurately located and properly dimensioned through hole is provided in the roof sheathing and duct 46. In such case the upper end tube 450 is flanged and the lower end is slitted to provide bend over tabs.

In the case of a center feed mode, as illustrated by the smallest collector module 221" shown in FIG. 19, a center feed manifold assembly 454 is provided. Assembly 454 is similar in construction to assembly 216 except that it has a top panel having a width of 34¾" instead of 16¾", with duct fitment 444 located in the lower right hand corner thereof. The outlet duct fitment 448 used in a center feed arrangement is located beneath and diagonally staggered from fitment 444 as indicated in FIG. 19 by the staggered orientation of the return duct 42 and the hot air outlet duct 44. In this center feed mode, the same 4'×8' exterior lights 222 and 224 are employed, but the interior glazing consists of two midsize lights of nominal 4'×6' dimension. With the center feed module 221" cool return air enters via duct 42 and through the fitment 444 into the outer solar heating compartment 225, where the air flow divides approximately equally and flows toward the opposite longitudinal ends of the compartment. The air returns to the lower solar heating compartment 227 via the two air gaps 218 and returns to join again at the hot air outlet fitment 448 and then exits via the associated ductwork 44 and 46.

Thus, regardless of whether an end feed or center feed collector mode is used, only one return cool air duct 42 and one heated air duct 44 is required for each horizontal row of the solar collector array. In order to accommodate different capacity collectors, i.e., length variations from 16 ft. to 96 ft. in 8 ft. increments, a range of diametrical sizes of fitments 444 and 449, are provided as follows (for center feed mode): 8" diameter for solar collector lengths of 16', 24' and 32'; 10" diameter ducts for 40' and 48' rows, 12" diameter ducts for 56', 64' and 72' rows and 14" diameter ducts for 80', 88' and 96' rows. For the end feed mode collectors, row lengths of 16', 24', 32', 40' and 48' only are used, and the smaller three sizes take 8" diameter ducts and the larger two sizes take 10" diameter ducts. In the foregoing working example, the above diametrical dimensions are intended for a system using a blower flow rate computed from the relationship of two standard cubic feet per minute per square foot of collector solar aperture area.

SOLAR COLLECTOR INSTALLATION

To install a solar collector array in accordance with the present invention, the roof sheathing 204 is first covered with overlapping flashing 206 in water-shedding, shingle fashion. Alternatively, flashing 206 may be laid down in long or horizontal side edge abutment with appropriate sealant or mastic used along the butt joint thereby allowing use of commercially available 48" roof flashing material. The ductwork apertures are formed as required and the warm air fitment 449 is installed. Then a vertical jamb extrusion 360, and one or more sill beams 234 of appropriate selected lengths is fastened into predrilled holes with lag screws 451 which extend through sheathing 204 and screw into roof rafters 205 (FIG. 12). These screws are inserted through Delrin or Teflon slide support washers 453 which rest on the upper surface of flanges 238 and 240, and then through longitudinally extending slots 455 provided at spaced intervals in a row along each of the mounting flanges 238 and 240 of each of the beam types 230, 232 and 234 (FIG. 14). Plastic washers 453 in conjunction with their associated fasteners 451 provide a corrosion resistant, non-odoriferous heat resistant slide support for the horizontal framework members 230, 232, 234 during thermally induced expansion and contraction thereof. Preferably in the center of the longitudinal dimension of each center feed array's rows of head 230, intermediate 232 and sill 234 beam extrusions one laterally spaced pair of the screws are installed at the opposite longitudinal ends of the laterally spaced pair of center slots (a diagonally staggered relationship) to thereby locate the beam accurately on the roof and prevent the same from shifting longitudinally. However, the screw fasteners 451 longitudinally spaced in either direction from center pair towards the opposite longitudinal ends of the horizontal extrusion rows are inserted centrally through the aforementioned slots 455 to thereby accommodate thermal expansion and contraction longitudinally of the horizontal extrusion rows of the collector array. When installing an end feed array, the pair of diagonally staggered fixing screws are installed in the laterally spaced pair of beam slots closest to the ductwork apertures (i.e., at the duct end rather than at the center of the array) so that the thermal movement of the array does not wrack or damage such end feed manifold ducts. It is also to be noted that the end and manifold jambs 360 and 362 are not fastened to the roof sheathing or other building collector support structure but instead are fastened at their longitudinal ends only to the associated beams 230, 232, 234. Thus all vertically oriented (parallel to the width dimension of the collector) framework members of the array are free to "float" with their associated horizontal framework members during longitudinal thermal expansion and contraction of the array relative to its fixed point at the ductwork location.

In installing a two-row collector array 200 as illustrated in FIGS. 10, 12 and 13, the next step in installation is to set in place the interior struts 370, and the remaining turn-around end jambs 362 or manifold end jambs 360. These inner verticals are used to rough space the intermediate and head beams 232 and 230. The outer notched vertical struts 390 are engaged with all of the horizontal beams temporarily to jig the intermediate and head beams 232 and 230 in properly vertically spaced relation on the roof above the sill beam 234. Pre-drilling clearance holes in an accurate pattern in the roof support structure assists in beam placement. Once properly located, beams 232 and 230 are likewise secured by screws 451 through the roof sheathing 204 and screwed into rafters 205 (located on 2' or 4' centers). Then the uppermost insulation 356 is positioned and the uppermost perimeter flashing 352 installed as required for the particular roof installation. Then, the black body 208 is layed into position and suspended by simply snapping in place the spring hook ends 432 of clips 294 between the retainer flanges 290, 290' and flanges 266 and 266' of the associated horizontal beams. Prior to this step (and usually prior to site delivery), the seal strips 258 have been installed on flanges 266 and 266' as well as on the end flange 361 of end jamb 360 (FIG. 13). Cold air duct fitment 444 is inserted through its associated roof aperture and its lower serrated flange is bent over beneath the underside of the upper wall of duct 68. The appropriate array of interior vertical struts 370 are laid in place with associated seal strips pre-installed thereon. Then the inner lights 212 and 214 as well as manifold assembly 216 are laid in place on top of the lower seal strip. The retainers 280 are next slipped into place, engaging flanges 272 and 274, while the upper seal 288 is roll wedged against the upper surface of lights 212, 214 and manifold assembly 216.

The next lower vertical row of the collector module is constructed in the same fashion and by following the same procedure in the above sequence. It is to be understood that in such multiple row installations, the installers build two or more rows in the following sequence: (1) install black body 208 in the upper row; (2) install middle glazing 210 in upper row; (3) install black body in next lower row; (4) install middle glazing in said next lower row; (5) repeat for any further lower rows.

Using spanning scaffold boards which rest on and engage the horizontal beams of the array the next step is to install outer verticals 390 permanently and then the outer glazing 220 is laid in place, preferably moving downwardly in column fashion so as to complete all horizontal rows together. It is to be understood that the inner and outer struts 370 and 390 are individually removed as interference develops relative to installation of the black body and inner and outer glazing lites, and individually replaced into position. Replacing the outer struts individually as soon as possible helps maintain precision parallel alignment of the horizontal beams of the array during the foregoing collector array construction.

Once the outer lights 222 and 224 are laid in place on the lower seal strip 258 of flanges 250, 250', they are then secured in place by attaching the caps 330 and 334 and end caps 336. The screw covers 334 are then snapped into place.

When this installation procedure is completed the result is a neat, water-tight solar collector glazing system, similar in some respects to the curtain-wall systems on steel skyscrapers, the same having been created from standard components in an easily built up array to provide a solar collector that can blend architecturally with a roof in a "flush with the shingles manner" as illustrated in FIG. 10, or in an above the shingle installation, as required. In either case, the internal water-weep system, the drain tube 344, and the collector back panel 206 provide added insurance against water penetration.

It is also to be understood that suitable conventional "glass stops" (not shown), consisting of rectangular rubber blocks are installed at longitudinally spaced intervals along the "downhill" edges of the inner and outer glass lites by inserting the stops in the ledge spaces available at the respective junctions of beam flanges 250 and 266 (and 250" and 266", when intermediate beam 232 is employed) with the web 236 of sill beam 234. The lowermost corner edge of each of these stops may be cut away to allow water to run past for drainage in the water weep system. These stops thus cushion some or all of the weight of the glass lites, depending upon the tilt angle of the array, in a manner similar to their function in building curtain wall systems.

From the foregoing description, it will now be better understood how the modularized components employed in the solar collector system of the invention provides great design versatility. The two basic modular beam length sizes, 16' and 24', provide open-ended modules which can be installed horizontally in series in various configurations to form collector arrays varying in length from 16 ft. to 96 ft. in 8 ft. increments. Even the longest horizontal module row possesses only a single inlet 42 and warm air outlet 44. Additional module rows can be added vertically to form 8 ft., 12 ft., 16 ft., 20 ft., or 24 ft. high roof or wall module collector arrays simply by adding another aluminum intermediate extrusion and associated glass panels for each additional module row. As illustrated in FIGS. 18, 19 and 20, the position of the air ducts in each module row can be on the left-hand end, right-hand end or in the center of the array. As illustrated in FIG. 21, a solar collector array 460 of 768 square feet can thus be made which is three rows (12') high and 64 feet long, the ducting being a center fed mode. Manifold ducts 46 and 68 are connected as described in conjunction with FIG. 1 to interconnect the module rows, reducing the number of ducts running to and from the entire collector array to just the two ducts 46 and 68. This minimization of ducts eliminates unnecessary static pressure drops, reduces the required roof or wall penetration and leaks, and allows the installation of the collector system of the invention over a cathedral ceiling with no ducts visible from the room below. The insulated ducts can be hidden above a closet or wall storage cabinet or interiorly of the ceiling above the insulation layer.

ENERGY STORAGE

The energy storage facility 34 employed with the solar heating system of the invention may be of any well-known conventional type, such as those employed in prior art solar heating systems, and preferably comprises a rock bin storage type of facility described in connection with the solar heating system illustrated in FIG. 1. However, in accordance with the present invention, it is preferred to provide an improved ducting arrangement for such an energy storage facility as illustrated by the rock storage structure 34' shown in FIGS. 23 through 26. Rock storage 34' may have the usual upright cinder or concrete block walls, as shown, (or 2"×6" insulated wood walls) including side walls 462 and 468, front walls 464 and 466 and top wall 470. In accordance with this feature of the invention, the air conduits 74' and 78' (corresponding to the previously described conduits 74 and 78) are led to the rock storage 34' via a Y-branch ducting 472 and 474 respectively.

Each of these Y connections includes an internal damper 476 and 482 respectively which are suitably remotely controlled by suitable motor and control components. Thus damper 476 is operable to divert air from conduit 74', when flowing therein toward rock storage 34', all into the upper branch conduit 478, or all into the lower branch conduit 480, or in any ratio therebetween. Likewise, when flow is away from the rock storage into conduit 74', damper 476 likewise can be positioned to take all of the air from conduit 478, all from conduit 480 or in any ratio therebetween. The damper 482 of Y-connection 474 is controllable in the same manner as damper 476 for ratioing the air flow to and from conduit 78' relative to the associated upper and lower branch conduits 484 and 486. All four conduits 478, 480, 484 and 486 extend horizontally into the storage bin 34' parallel with one another and terminate adjacent the rear wall 456. Suitable porting 488 is provided in each of the branch conduits within the rock storage area to evenly distribute the flow of air into the pile of rocks 490, or to withdraw air therefrom, depending upon the mode of operation selected.

As illustrated in FIG. 24, dampers 476 and 482 when positioned to shut off air flow to and from the associated lower branch conduits 480 and 486, will cause the air flow through the rock storage 34' to travel solely between the upper conduits 478 and 484. The air travel can be in either direction between conduits 478 and 484, depending upon the selected mode of operation of the solar heating system as described previously herein, so as to either add heat to, or withdraw heat from, generally the upper half of the rock pile 490, which is generally the zone 492 shown in section lines in FIG. 24.

As depicted in FIG. 25, a utilization zone 494 of triangular shape, of greater capacity than the zone 492, can be obtained by suitably positioning dampers 476 and 482 such that the flow to or from duct 74' is divided equally between upper and lower branch conduits 478 and 480, whereas branch 486 is shut off by damper 482. Of course, the reverse pattern to that of 494 can be obtained by using ducts 484 and 486 in combination with only duct 478, or the combination of split flow between ducts 478 and 480 and only duct 486. Essentially, 75% of the capacity of the rock storage 34' is used in the mode of FIG. 25 versus 50% of the storage capacity in the mode of FIG. 24.

Referring to FIG. 26, the entire capacity of the rock storage 34' may be utilized as indicated by the cross-sectioned zone 496. In this mode, dampers 476 and 482 are each oriented the same at mid position to divide the flow equally to or from the associated branch conduits.

The foregoing energy storage flow ducting system of FIGS. 23 to 26 thus provides greater flexibility for balancing various system modes, especially in non-optimum horizontal flow bins, i.e., when less than all the storage capacity is needed, a faster temperature rise time and higher delivery temperatures can be obtained, and the efficiency and performance of the system thereby enhanced.

CONTROL SYSTEM 38

General or overall operation of control system 38 as related to air handler 32 and solar collector 30 has been set forth hereinabove. Following is a detailed description of one presently preferred embodiment of control system 38 illustrated schematically in FIGS. 27 and 28.

CONTROL INPUTS

Referring to FIGS. 1-5 and 27-28, the function and location of the various temperature and switch control inputs to control system 38 are summarized in Tables I and II as follows:

TABLE I

| Control Inputs | | |
|---|---|---|
| Designation | Location & Function | Operating Mode |
| TC01 | Collector 30, Air Space Temp. ΔT1 High Sensor | Modes 1-4 |
| TC02 | Collector 30, DHW Temp. ΔT2 High Sensor | Mode 5 |
| TC03 | Collector 30, Pool Temp. ΔT3 High Sensor | Mode 5 |
| TC04 | Collector 30, Air Limit Therm | Modes 1-4 |
| TCI | Return Air Chamber 64, ΔT1 Low Temp. Sensor | Modes 1-4 |
| THE | DWH Coil 58, ΔT2 High Temp. Sensor | Modes 1-4 |
| THEP | Pool Coil 60, ΔT3 High Temp. Sensor | Modes 1-4 |
| TP | Pool Water, ΔT3 Low Temp. Sensor | Modes 1-5 |
| W1,W2 | House Air Space Thermostat | Modes 1-4 |
| TST | Storage Bin 34 Thermostat | Modes 1-4 |
| TWT | Solar Storage Tank 96, ΔT2 Low Temp. Sensor | Modes 1-5 |
| TPT | Pool Temp. Select Thermostat | Modes 1-5 |
| DHW | DHW Storage Tank 96, Overheat Therm. | Modes 1-5 |
| TWS | Domestic Hot Water Temp. Select Thermostat | Modes 1-5 |
| 2S | Mode Selector Switch  Pos. 1 | Modes 1-4 |
|  | Pos. 2 | Mode 5 |
| 1S | Manual Emergency Mode 1 Switch  Pos. 1 | Man.Mode 1 on if SW 2S in Mode 5 Pos. |
|  | Pos. 2 | Man.Mode 1 off |
| 3S | Pool Mode Select Switch  Pos. 1 | Pool Modes 1-4 |
|  | Pos. 2 | Pool Heat Off |
|  | Pos. 3 | Pool Mode 5 |
| 4S | Blower Speed Select  Pos. 1 | High Speed |
|  | Pos. 2 | Low Speed |

TABLE II

| Damper Motor Limit Switches (FIG. 27) Shaft Settings | | | | |
|---|---|---|---|---|
| Limit Switch | Motor | Damper | Shaft Setting | Operating Mode |
| SWM1 | M1 | MD1 (N.O.) | 70° | Modes 2 and 3 |
|  |  | MD1A (N.C.) |  |  |
| SWM2 | M2 | MD2 (N.C.) | 70° | Modes 1-3 |
|  |  | MD7 (N.C.) |  |  |
| SWM4 | M4 | MD4 (N.C.) | 70° | Mode 4 |
| SWM5 | M5 | MD5 (N.C.) | 70° | Mode 5 |
| SWM6 | M6 | MD6 (N.C.) | 5.0° | Modes 2-4 |

Each of the motor limit switches is shown in the normal or unactuated condition in FIG. 27. Damper motors M1-M6 preferably comprise model M836A-1034 motors with adjustable limit switches manufactured by Honeywell Corporation.

Damper motor operation in the various operating modes may be summarized in tabular form as follows:

TABLE III

| Damper Motors - Mode Chart | | | | | | |
|---|---|---|---|---|---|---|
| Mode | M1 | M2 | M3 | M4 | M5 | M6 |
| Standby | Off | Off | Off | Off | Off | Off |
| Mode 1 - Coll. Heat | Off | On | Off | Off | Off | Off |
| Mode 2 - Stored Heat | On | On | Off | Off | Off | On |
| Mode 3 - Aux. Heat | On | On | On | Off | Off | On |
| Mode 4 - Storage | Off | Off | Off | On | Off | On |
| Mode 5 - DHW (summer) | Off | Off | Off | Off | On | Off |
| Manual Mode 1 (Switch 1S) | Off | On | Off | Off | Off | Off |

The various thermostat and temperature sensors (Table I) are functionally connected in control system 38 (FIG. 27) to temperature differential controllers ΔT1, ΔT2 and ΔT3 as shown schematically in FIG. 28 and summarized in tabular form as follows:

TABLE IV

| | ΔT Differential Controllers | | |
|---|---|---|---|
| Modes | Space Heat (ΔT1) | DHW (ΔT2) | Pool (ΔT3) |
| 1-4 (Winter) | TC01-TCI | THE-TWT | THEP-TP |
| 5 (Summer) | Not Used | TC02-TWT | TC03-TP |

Preferably the differential temperature or ΔT controllers comprise model R7412A controllers manufactured by Honeywell Corporation. Control details of the ΔT controllers will be set forth as the description unfolds.

SOLAR CONTROL SEQUENCE OF OPERATIONS

Space heating is user controlled by a standard two-stage thermostat W1,W2 (FIGS. 1-5 and schematically in FIG. 27). First stage heating is to be accomplished when the W1 contact is closed indicating that house temperature is less than a first set point. Solar energy from collector 30 (FIGS. 1-5) is moved by blower 56 in air handler 32 to heat the house and thereby satisfy the W1 heat demand. Second stage heating is to be accomplished when the W2 contact is closed, indicating a house temperature less than a second set point less than the first W1 set point. Heat energy is then supplied from storage bin 34 to satisfy a W2 heat demand. Auxiliary energy from furnace 36 may also be supplied if storage sensor TST indicates inadequate bin temperature. It will be recognized that the W1 contact is closed when the W2 contact is closed, which is to say that there cannot be a W2 heat call without a simultaneous W1 heat call.

Referring to FIG. 27, control system 38 is powered by a standard utility 120 VAC input. Power input is coupled by a 120/24 VAC step-down transformer T1 to the W1,W2 house thermostat, indicated schematically as including a three position thermostatic switch 802. Input power is also coupled by a second 120/24 VAC step-down transformer T2 to bus lines 804,806 which power the remainder of the control system. Input power is also available for actuation of the motor B1 (FIG. 27) of blower 54 (FIGS. 1-5) via controlled switches to be described. Mode select switch 2S (Table I, FIGS. 27-28) has a first pole 2S1 (shown only in FIG. 27) for feeding power from bus 804 to various portions of the control selectively in either a Mode 1-4 position or a Mode 5 position. A second pole 2S2 of switch 2S, ganged to pole 2S1, is connected as shown only in FIG. 28 for feeding signals from the two temperature sensors THE and TCO2 to the ΔT2 controller in operational Modes 1-4 (THE) and Mode 5 (TCO2). Similarly, switch pole 3S1 of switch 3S (FIG. 28) feeds temperature control signals to the ΔT3 controller as a function of operating modes. In addition, switch pole 3S1 has a center off position which disconnects both high sensors THE and TCO3 from ΔT3 controller. Switch 35 also has a second pole (not shown) ganged to pole 3S1 which disconnects power to controller ΔT3 only when the switch pole 3S1 is in center position. See Table I. Emergency Mode 1 switch 1S (Table I, FIG. 27) feeds power from bus 804 to damper motor M2 when thrown independently of the control circuitry. In order to utilize this manual Mode 1 switch, switch 2S is first placed in Mode 5 position.

The preferred embodiment of control system 38 is illustrated in FIG. 27 as comprising a number of control relays 1K to 9K having normally open and/or normally closed contact sets interconnected to operate under various conditions set by the input controls (Table I). Each set of relay contacts is identified in FIG. 27 by the associated relay coil designation followed by a numerical suffix. For example, 1K1 indicates contact set 1 associated with control relay 1K. All contact sets are shown in the normal or unactuated condition (open or closed) in FIG. 27.

To recap the previous discussion relative to FIGS. 2-5, the control modes are as follows:
Mode 1—Collect solar energy and heat load directly;
Mode 2—Transfer energy from storage to load directly;
Mode 3—If storage bin temperature falls below chosen heating temperature limit, provide auxiliary energy;
Mode 4—Collect solar energy and put in storage; and
Mode 5—(Summer use only) provide domestic hot water and pool heat.

During Modes 1-4, hot water and pool heat is obtainable whenever blower 56 moves high temperature air past DHW coil 58 and pool coil 60, including during night heating from storage (Mode 4).

MODE 1—HEAT FROM COLLECTOR

Referring specifically to FIGS. 2 and 27, and in summary, whenever (1) temperature sensor TCO1 in collector 50 is 32° F. (adjustable) greater than that at sensor TC1 in air handler 52, (2) TCO4 limit thermostat in collector 50 indicates a temperature above 90° F. (adjustable), and (3) there is a W1 call for heat from house thermostat W1,W2, then Mode 1 operation (FIG. 2) is automatically actuated. Mode 1 lamp 810 (FIG. 27) is lit, and damper motor M2 opens normally closed dampers MD2 and MD7. When damper motor limit switch SWM2 (FIG. 27) closes the associated normally open contacts R and B, relay coil 8K is engaged via limit switch SWM6 and normally open contacts 8K1 close to energize blower motor B1 via high/low speed switch 4S and fuse F8. As noted above switch pole 1S1 is connected for manual activation of motor M2 in manual Mode 1 operative independently of the house thermostat.

More specifically, Mode 1 is entered automatically when a first stage call for heat from switch contact W1 occurs. Relay coil 1K is energized via transformer T1 to close the associated normally open contacts 1K1, 1K3 and open the normally closed contacts 1K2. When the temperature difference between sensors TCO1 and TCI is at or above the set point of controller ΔT1, the normally closed and normally open contacts controller ΔT1 change states. Similarly, when the air temperature in collector 30 is above the set point of sensor TCO4, and TCO4 normally open and normally closed switches change states. Current is then fed through thermostat TCO4, controller ΔT1 and contacts 1K3 to light the Mode 1 lamp 810. Motor M2 is actuated through normally closed contacts 4K3 and fuse F2 to open dampers MD2 and MD7. When motor M2 limit switch SWM2 closes its normally open contacts R and B, relay coil 8K is energized via the normally closed RW contacts in switch SWM6. Contacts 8K1 then close to actuate solar blower B1 as previously described. When space heat is no longer required, thermostat contact W1 opens, relay 1K is de-energized, contacts 1K3 open, motor M2 turns off, switch SWM2 returns to normal, relay 8K de-actuates and blower B1 turns off.

MODE 2—HEAT FROM STORAGE

Assume (1) the ΔT1 differential control, the TCO4 limit thermostat or both are not energized, (2) the W1 and W2 contacts both indicate a demand for heat, (3) the TST storage thermostat is above its set point causing the TST normally closed contacts to open and the TST normally open contacts to close, and (4) switch 2S is in the Mode 1-4 position. Relays 1K and 2K will be energized and the Mode 2 lamp 812 will light via contacts 2K1 and 3K2. Relay 3K will be energized via contacts 2K1 and either the normally closed contacts of controller ΔT1 or the normally closed contacts of limit thermostat TCO4. According to an important feature, relay 3K latches via contacts 1K1 and 3K1 until both W1,W2 heat calls are satisfied. Additionally, relay coil 4K is energized through contacts 3K2 to close normally open contacts 4K1, 4K2 and open normally closed contacts 4K3. The 4K1, 4K2 contacts actuate (1) damper motor M2 through fuse F2 to open dampers MD2 and MD7 (FIG. 3), (2) motors M1 via fuse F1 to open normally closed damper MD1A and close normally open damper MD1 and (3) motor M6 via fuse F6 and normally closed contact set 5K1 to open damper MD6 (FIG. 3). Open contacts 4K3 prevent illumination of Mode 1 lamp 810 during Mode 2 operation. When the damper shaft of motor M2 rotates 70°, the RB contacts of limit switches SWM1, SWM2 cooperate to energize relay 8K and actuate blower motor B1 as previously described. When both W1,W2 heat calls have been satisfied, relay 3K de-energizes, relay 4K de-energizes, and motors M1, M2 and M6 are turned off, relay 8K de-energizes, and blower motor B1 turns off.

MODE 3—AUXILIARY HEATING

Mode 3 is identical to Mode 2 with respect to all sensor states and damper positions as above described, with the exception that the TST storage thermostat indicates a temperature below the selected adjustable temperature set point (e.g. 90° F.) and therefore has its contacts in the normal condition. This temperature set point is chosen by determining minimum temperature required to satisfy demand of space heat thermostat W1,W2 under worst case temperature operation (i.e., coldest winter day anticipated). The Mode 3 lamp 814 is lit and a heat call is fed to auxiliary furnace 36 (FIG. 2), both via contacts 3K2. Blower B1 will move air through bin 34 and auxiliary furnace 36 as previously described in connector switch FIG. 3. Optional damper motor M3 is also actuated via fuse F3. It will be recognized, of course, that Mode 3 may be entered directly with thermostat TST initially de-actuated, or through Mode 2 when thermostat TST de-actuates during blower operation. If desired, an additional control relay 6K may be energized by a furnace call to activate an auxiliary blower B2 from 120 VAC via contacts 6K1 and fuse F11.

MODE 4—STORAGE OF SOLAR ENERGY

Referring to FIGS. 4 and 27, and in summary, operating Mode 4 will be entered and solar energy will be stored in bin 34 whenever the collector temperature indicated by sensor TCO1 rises to more than 32° F. (adjustable) above that of the storage bin return air measured by TC1. Energy storage continues until this temperature difference falls to less than 16° F. (adjustable), at which point storage Mode 4 is terminated.

More specifically, assume (1) Mode 1-4 operation at switch pole 2S1, (2) the temperature difference between TCO1 and TCI exceeds 32° F. (adjustable) such that controller ΔT1 is activated, (3) the temperature of the collector measured by TCO4 exceeds its set point such that TCO4 is activated, and (4) there is no demand for heat from the W1,W2 house thermostat. Then current from bus 804 is directed through switch pole 2S1, the normally open contacts of TCO4 limit thermostat which are now closed and the differential controller ΔT1, and then through normally closed contacts 1K2,2K2 to light Mode 4 lamp 815 and energize relay 5K. This closes normally open contacts 5K2, 5K3 and opens normally closed contacts 5K1. Motors M4 and M6 are energized via respective fuses F4 and F6 causing dampers MD4 and MD6 (FIG. 4) to open allowing the charging of storage bin 34 through upper port 70. The storage bin return air flows out of the bin through lower port 76 and damper MD6 to collector 30 for another solar heating cycle. Open contacts 5K1 isolate motors M1 and M2.

When damper motor M6 rotates its actuator shaft 5°, the normally closed R-W contacts of limit switch SWM6 open and disconnect bus 804 from contacts R of SWM1 and B of SWM2. When motor M4 rotates 70°, the normally open contacts R-B of limit switch SWM4 close to energize relay 8K through the contacts of limit switch SWM2. Contacts 8K1 close to actuate the air handler blower B1 as previously described, causing collector air to be moved to storage.

DOMESTIC HOT WATER PRE-HEATING

In Modes 1-4, a separate water heating loop provides pre-heating of domestic hot water (DHW) by passing incoming water through water coil 58 (FIGS. 104) in the warm air stream. This water pre-heating can also occur during night operation. The DHW loop includes solar storage tank 96, water pump P1, air-water heat exchange coil 58 and the ΔT2 differential control (FIG. 27, Table IV).

Assume the DHW differential controller ΔT2 is actuated, indicating that the temperature at sensor THE on water coil 58 is 20° F. (adjustable) greater than that at storage tank sensor TWT. The normally open contacts of ΔT2 close, allowing power from bus 804 to be directed by switch pole 2S1 (Modes 1-4) through the DHW 175° F. push-to-reset over-temperature protect switch 820, and through an adjustable water temperature select thermostat TWS, to energize relay 7K. This causes normally open contacts 7K1 to close, and thereby actuates the water pump P1 via fuse F7 and contacts 8K1 (which are closed during operation in any Mode 1-4). Pump lamp 816 is also lit. Pump P1 will remain on as long as the tank temperature is less than the TWS set point (140° F. adjustable), and also as long as differential controller ΔT2 indicates that energy is available at coil 58 ((i.e. T2 in a range above 20° F. (adjustable) at turn on but turns off if less than 8° F. (adjustable)).

POOL WATER PRE-HEATING

In Modes 1-4, a separate pool water heating loop is provided for pre-heating of pool water by passing the same through the second air-water coil 60 (FIGS. 1-5) located adjacent to and downstream of DHW coil 58 in the warm stream leaving of blower 54. This pre-heating of pool water to 85° F. (adjustable) can be accomplished automatically any time sufficient heat exists at coil 60, even during night heating of house from storage. The pool heating loop 38 includes pool 104 (FIG. 1), pool pump P2, air-water heat exchange coil 60, differential controller ΔT3 (FIG. 27, Table IV), pool water temperature sensor TP and temperature select thermostat TPT, by-pass valve 114 (FIG. 1), and primary pool heater 116.

Assume Mode 1-4 operation at switch 2S1 (FIG. 27), that pool differential control ΔT3 is actuated indicating that the temperature at sensor THEP on pool coil 60 is 20° F. greater than that at pool water sensor TP, then the normally open contacts of control ΔT3 close to direct power from bus 804 through the TPT pool water temperature select thermostat (adjustable 55°-175° F.) to energize relay 9K. This causes the normally open 9K1 contacts to close, thereby energizing pool bypass valve 114 vis fuse F10 to direct an adjustable fraction of the filtered pool water through pool heat exchange coil 60. During Mode 1-4 operation, energy is extracted to heat pool water only during periods when blower 54 is moving warm air past pool coil 60. Pool demand does not independently actuate pool water preheating in Modes 1-4.

MODE 5—SUMMER DOMESTIC HOT WATER AND POOL WATER PRE-HEATING

For summer operation in Mode 5, sensor TCO2 replaces sensor THE in differential control ΔT2, and sensor TCO3 replaces sensor THEP in differential control ΔT3. This is accomplished by other poles of switch 2S shown in FIG. 28. Switch pole 2S1 in the Mode 5 position 2S1 directs bus power to relay contacts 9K2 and 7K2, and removes bus power from the ΔT1 space heat differential control. This effectively eliminates any possible Mode 1-4 operation by disconnecting all relays 1K,2K,3K,4K,5K,6K. In Mode 5, either DHW or pool water preheat, or both, can be accomplished while energy storage and space heating is eliminated.

When the temperature at collector sensor TCO2 is 20° F. (adjustable) greater than that at DHW tank sensor TWT, the normally open contacts of ΔT2 close to feed bus power from switch pole 2S1 through DHW over-temperature relay 820 to energize relay 7K. Pump P1 is energized through contacts 7K1 as previously described to circulate water through DHW coil 58. Relay contacts 7K2 energize motor M5 via fuse F5 to open damper MD5 (FIG. 5). When the limit SWM5 switch in motor M5 actuates, the associated R-B contacts close to energize relay 8K whose 8K1 contacts energize blower B1. This mode of operation will continue until the differential temperature ΔT2 between collector and storage tank falls to less than 8° F. (adjustable).

POOL WATER PRE-HEATING

When the temperature at collector sensor TCO3 is 20° F. (adjustable) greater than that at pool sensor TP, the normally open contacts of ΔT3 differential control close. If the pool water is below the TPT set point, power at bus 804 is fed through ΔT3 and TPT to energize relay 9K. Contacts 9K1 close and actuate pool bypass valve 114 as previously described. The normally open contacts 9K2 actuate damper motor M5 via switch pole 2S1. Damper MD5 is thus opened by independent pool demand in Mode 5 operation (summer). The opening of damper MD5 causes limit switch SWM5 contact R-W to close, energizing relay 8K and causing contacts 8K1 to actuate blower B1 as previously described.

To recap, winter mode of operation (Modes 1-4) versus temperature sensor indications may be summarized in tabular form as follows:

TABLE V

| | Mode Chart - Critical Temperatures | | | |
|---|---|---|---|---|
| | W1,W2 | TCO4 (°F.) | ΔT1 (°F.) | TST (°F.) |
| Mode 1 | On Off | >90 | >32 | Any |
| Mode 1 | On On | >90 | >32 | Any |
| Mode 2 | On On | Any | <32 | >85 |
| Mode 2 | On On | <90 | >32 | >85 |
| Mode 3 | On On | Any | <32 | <85 |
| Mode 3 | On On | <90 | >32 | <85 |
| Mode 4 | Off Off | >90 | >32 | Any |
| Standby | Any Off | <90 | Any | Any |
| Standby | Any Off | Any | <30 | Any |

It will be appreciated that all temperatures, temperature differentials and temperature set points previously set forth, while presently preferred, are adjustable and may be varied as conditions require.

I claim:

1. A solar collector construction adapted to be mounted to a supporting surface inclined at any angle from vertical to horizontal comprising a sill beam adapted to extend horizontally along the supporting surface and at least a head beam adapted to extend parallel to said sill beam and adapted for mounting to said supporting surface so as to form an opposite side wall of said solar collector, an end jamb extending perpendicularly to said head and sill beams to define one end wall of said solar collector, a manifold turnaround jamb extending perpendicularly between said sill and head beams and spaced longitudinally of the collector from said end jamb to define an opposite end wall of said collector, said beams and jambs each comprising an aluminum extrusion having a generally I-shaped cross-sectional configuration defined by a bottom flange adapted for mounting against said supporting surface by fasteners, a top flange protruding laterally from the opposite sides of a center web of the cross section, the portion of the top flange protruding internally within the collector towards one another providing a shelf for mounting of an outer glazing light array on said collector, the portion of said top flange protruding laterally outwardly externally of said collector providing a mounting surface for surrounding weather-proof flashing, a plurality of cap strips secured to the upper edges of said beams and jambs in superimposed relation to said outer glazing and surrounding flashing to clamp the same against the top flanges of said beams and jambs, said beams and said end jamb each having an intermediate flange protruding laterally from the center web thereof interiorly of said collector to form a shelf intermediate said top and bottom flanges of said beams and jamb for supporting an inner glazing lite array thereon, said beams and end jamb each further having a pair of longitudinally extending hook flanges spaced laterally from one another and protruding from the interior side of said center web in the space between said intermediate flange and the interior portion of said top flange, a plurality of retainer channels of generally C-shaped cross-sectional configuration having a pair of free end edges engaged respectively with said hook flanges and surmounting the adjacent edges of said inner glazing lite array to clamp the same against said intermediate flanges of said beams and end jamb, and a black body mounted in the space between said inner glazing lite array and said bottom flanges of said beams and jambs.

2. A heat absorber black body for a solar collector of the air-type comprising a single layer of metallic warp and woof elements woven into an open mesh screen having an open space area of approximately fourteen percent of the total area of said mesh screen to provide a maximum first pass optical opacity viewed in a direction perpendicular to the plane of said mesh of approximately eighty six percent, said screen being made up in long and narrow lengths and having a retainer clamp strip secured to each longitudinal edge thereof, said strip having a generally box-like configuration made up of two spaced parallel sides connected by a bight portion, with one of said sides being slightly wider than the other and having an inturned flange adapted to overlap a flange turned inwardly from the outer edge of the other side, said mesh screen being received along its associated edge within the space defined inside said strip and secured by a crimped overlapping relationship of said inturned edge flanges of said parallel sides, said retainer strips having spaced notches therein at longitudinally spaced intervals along said strip, and further including a plurality of spring clips each having one end inserted into said notches and retained within the interior of said strip.

3. A modular solar heat collecting system utilizing a solar heat collector and a forced flow gaseous heat transfer fluid medium, said collector having a rectangular box-like shape with a lengthwise dimension several times the width dimension of said collector and a thickness dimension much less than said width dimension, said collector having an inner heating compartment defined by and extending between a reflective bottom surface extending substantially the length and width of said collector and a solar transmissive inner glazing means spaced from and extending parallel to said bottom surface, said collector having an outer heating compartment defined by and extending between said inner glazing means and a solar transmissive outer glazing means spaced from and extending parallel to said inner glazing means on the side thereof remote from said inner compartment, an inlet duct for said fluid medium communicating with said outer compartment at given location longitudinally of said collector, said outer and inner compartments being in fluid communication with one another at a longitudinal end thereof remote from said inlet duct via a gap defined between an end edge of said inner glazing means and an end wall of said collector, an outlet duct for said fluid medium communicating with said inner compartment in the vicinity of said inlet duct longitudinally of the collector, and black body absorber means extending within said inner compartment parallel to said inner glazing means and said bottom surface and spaced approximately midway therebetween, said absorber means comprising a thin perforate member having a solar absorptive surface facing said inner glazing means and supported in said inner compartment such that said fluid medium can divide approximately equally for flow lengthwise of said inner compartment along both sides of said absorber means and back and forth therethrough without imposing a significant pressure gradient through said absorber means, and comprising an inventory of components made up in standard predetermined sizes for shipment as components to an on-site assembly location of said collector system, said components comprising horizontal framework members including sill beam means, head beam means and for plural row systems intermediate beam means, vertical framework members including end jamb means, manifold jamb means and inner and outer vertical strut means, and solar transmission and absorber means including outer glazing panels, inner glazing panels and black body means adapted for suspension from the horizontal framework members, said horizontal framework members being secured by fastener means to a supporting structure with said bottom surface thereagainst, said fastener means comprising first fasteners located only adjacent said inlet and outlet ducts and cooperating with said horizontal framework members to fix the same in a given location to said supporting structure and against thermally induced relative movement therebetween, and second fasteners spaced at intervals longitudinally of said horizontal framework members and progressively more remote from said first fasteners, said second fasteners cooperating with said horizontal framework members to fix the same in the direction of the width and thickness dimensions of said collector while accommodating thermally induced relative movement between said horizontal framework members and said supporting structure longitudinally of said collector.

4. Method of constructing a solar heat collector array for a solar heating system of the forced-flow gaseous heat transfer fluid medium type utilizing a solar collector having a rectangular box-like shape with a lengthwise dimension several times the width dimension of said collector and a thickness dimension much less than said width dimension, said collector having an inner heating compartment defined by and extending between a reflective bottom surface extending substantially the length and width of said collector and a solar transmissive inner glazing means spaced from and extending parallel to said bottom surface, said collector having an outer heating compartment defined by and extending between said inner glazing means and a solar transmissive outer glazing means spaced from and extending parallel to said inner glazing means on the side thereof remote from said inner compartment, an inlet duct for said fluid medium communicating with said outer compartment at given location longitudinally of said collector, said outer and inner compartments being in fluid communication with one another at a longitudinal end thereof remote from said inlet duct via a gap defined between an end edge of said inner glazing means and an end wall of said collector, an outlet duct for said fluid medium communicating with said inner compartment in the vicinity of said inlet duct longitudinally of the collector, and black body absorber means extending within said inner compartment parallel to said inner glazing means and said bottom surface and spaced approximately midway therebetween, said absorber means having a solar absorptive surface facing said inner glazing means and supported in said inner compartment such that said fluid medium can divide about equally for flow lengthwise of said inner compartment along both sides of said absorber means without imposing a significant pressure gradient through said absorber means, said collector being oriented in operation for solar incidence transverse to the plane defined by the length and width dimensions of said collector, with its lengthwise dimension extending generally horizontally, and said collector with its width dimension extending at an angle in the range of approximately 10° to and including 90° from horizontal, comprising an inventory of components made up in standard predetermined sizes for shipment as components to an on-site assembly location of said collector system, said components including horizontal framework members including sill beams, head beams and intermediate beams, vertical framework members including end jambs, manifold jambs and inner and outer vertical struts, and solar transmission and absorber means including outer glazing lites, inner glazing lites and a black body absorber adapted for suspension from the horizontal framework members, said method comprising the steps of:

(1) installing a reflective water-shedding sheathing against a building supporting surface over an area sufficient to receive said solar collector array thereagainst, (2) providing apertures for said inlet and outlet ducts through said sheathing and supporting surface in the appropriate location for end feed or center feed modes as desired, (3) installing one vertical jamb at one end of the layout of the array and one or more sill beams along the bottom edge of the intended array, (4) installing inner and outer vertical struts and remaining end jambs at longitudinally spaced intervals along said sill beams in conjunction with placement of an associated intermediate or head beam to temporarily jig the superposed intermediate or head beam in properly vertically spaced relation from the aforesaid sill beam, and then securing said intermediate or head beam to said supporting surface, (5) installing the cool air inlet and the warm air outlet ducts through their associated roof apertures, (6) installing the absorber black body by suspending the same from associated support structure provided on said sill and intermediate or head beams such that the black body extends laterally therebetween adjacent but spaced from said sheathing, (7) removing the inner struts as interference develops to the installation of the black body as set forth in step (6) and then replacing and fixedly securing the inner struts in proper location in preparation for installation of the array of inner glazing lites, the outer struts being individually removed and as interference develops to installation of the black body in step (6) and then replaced in jigging position as soon as possible as the installation of the black body progresses to maintain precision array alignment of said beams, (8) installing a selected array of inner glazing lites and cool air inlet manifold plate by placement of the same on the inner struts and on intermediate flange ledges provided along the sides of said sill and intermediate or head beams such that the inner lites and inlet manifold extend parallel to and are spaced above said black body, (9) installing retainer channels and associated wedge seals along the upper and lower side edges of the upper surface of said inner lite glazing and manifold to clamp the same on the associated beam flange ledges,

(10) installing clamping strips on said interior vertical struts along adjacent end edges of said inner lites and manifold plate to further clamp said inner lites and manifold plate in place,

(11) the outer struts being again individually removed and replaced as in step (7) as interference develops during installation of the inner lites and inlet manifold plate during step 8, and then, upon completion of at least step 8, fixedly securing all outer vertical struts at predetermined longitudinally spaced intervals along said beams,

(12) installing the outer glazing lite array by laying the same in place on the outer struts and on upper flange ledges provided along said sill and intermediate or head beam such that said outer lite array extends parallel to and spaced above said inner lite array and extends laterally between said sill and intermediate or head beam, and

(13) installing cap strips along the tops of said sill and intermediate or head beam, along said jambs and along the outer vertical struts at adjacent end edges of tandem outer lites to thereby clamp said outer lites onto said beams, jambs and struts.

5. A modular solar heating collector array for a solar heating system utilizing a forced flow gaseous heat transfer fluid medium, said array comprising a plurality of modular collectors each having an overall lengthwise dimension several times the width dimension of said collector, said collector having an inner heating compartment defined by and extending between an imperforate bottom surface extending substantially the length and width of said collector and a solar transmissive inner glazing means spaced from and extending parallel to said bottom surface, said collector having an outer heating compartment defined by and extending between said inner glazing means and a solar transmissive outer glazing means spaced from and extending parallel to said inner glazing means on the side thereof remote from said inner compartment, an inlet duct for said fluid medium communicating with said outer compartment at given location longitudinally of said collector, passage means operable to effect fluid communication between said outer and inner compartments at a longitudinal end thereof remote from said inlet duct, an outlet duct for said fluid medium communicating with said inner compartment in the vicinity of said inlet duct longitudinally of the collector, black body absorber means extending within said inner compartment parallel to said inner glazing means and said bottom surface and supported in said inner compartment such that said fluid medium can divide for flow lengthwise of said inner compartment along both sides of said absorber means, and support means connected to said collector such that said collector is oriented in operation for solar incidence transverse to the plane defined by the length and width dimensions of said collector and with its lengthwise dimension extending generally horizontally, said modular collectors being arranged on said support means in longitudinal end-to-end relationship with those longitudinal ends of said collectors which are disposed intermediate the opposite longitudinal ends of said array being interconnected for longitudinal flow of the fluid medium endwise successively from outer compartment to outer compartment of each collector and likewise from inner compartment to inner compartment of each collector in a reverse fold air flow pattern longitudinally of said array, said support means comprising trusses extending longitudinally transverse to the lengthwise dimensions of said collectors, a sheathing material supported on said trusses and defining said imperforate bottom surface of each of said plurality of collectors, and an inventory of components made up in standard predetermined sizes for shipment as components to an on-site assembly location of said collector array, said components being affixed to said support means and comprising horizontal framework members connected in end-to-end relationship and vertical framework members connected to define said opposite longitudinal ends of said array, said outer glazing means, inner glazing means and black body absorber means being suspended from said horizontal framework members.

6. In a solar heat collector for utilizing a forced flow gaseous heat transfer fluid medium, said collector having an inner heating compartment defined by and extending between an imperforate bottom surface and a solar transmissive inner glazing means spaced from and extending parallel to said bottom surface, an outer heating compartment defined by and extending between said inner glazing means and a solar transmissive outer glazing means spaced from and extending parallel to said inner glazing means on the side thereof remote from said inner compartment, an inlet duct for said fluid medium communicating with said outer compartment at given location longitudinally of said collector, fluid medium passage means communicating said outer and inner compartments at a longitudinal end thereof remote from said inlet duct, an outlet duct for said fluid medium communicating with said inner compartment in the vicinity of said inlet duct longitudinally of the collector and black body absorber means extending within said inner compartment whereby the pressurized fluid medium entering via said inlet duct flows longitudinally of said outer compartment, thence via said passage flows in reverse direction along said absorber means longitudinally of said inner compartment and exits therefrom via said outlet duct, the improvement wherein said absorber means comprises a thin perforate screen having a solar absorptive surface facing said inner glazing means and supported as a single layer in said inner compartment, said screen having a uniformly distributed open aperture area of about one seventh of the total area of said surface such that said fluid medium under forced flow divides approximately equally for flow lengthwise of said inner compartment along and in the same direction on both sides of said screen and back and forth therethrough without imposing a significant pressure gradient through said screen, said screen having a somewhat wavy contour longitudinally of said inner compartment.

7. A self-cooling solar heat collector module for a solar heating system utilizing a forced flow gaseous heat transfer fluid medium, said collector comprising a rectangular box-like modular construction having an overall lengthwise dimension several times its width dimension and a thickness dimension much less than its width dimension, said collector being sealed from exterior ambient air and having an inner heating compartment defined by and extending between an imperforate bottom surface extending substantially the length and width of said collector and a solar transmissive inner glazing means spaced from and extending parallel to said bottom surface, said collector having an outer heating compartment defined by and extending between said inner glazing means and a solar transmissive outer glazing means spaced from and extending parallel to said inner glazing means on the side thereof remote from said inner compartment, a sole inlet duct for said fluid medium extending transversely to the plane of and through said bottom surface and said inner compartment and communicating directly only with said outer compartment at a given location longitudinally of said collector, always open passage means operable to effect fluid communication between said outer and inner compartments at at least one longitudinal end thereof remote from said inlet duct, a sole outlet duct for said fluid medium extending transversely to the plane of and through said bottom surface and communicating directly only with said inner compartment in the vicinity of said inlet duct generally adjacent therewith laterally of the collector, black body fluid medium permeable and partially solar transmissive absorber means extending within said inner compartment between said inner glazing means and said bottom surface and supported in said inner compartment such that said fluid medium divides for flow lengthwise of said inner compartment along and in the same direction on both sides of said absorber means, and support means connected to said collector such that said collector is oriented in operation for solar incidence transverse to the plane defined by the length and width dimensions of said collector and with its lengthwise dimension extending generally horizontally and its width dimension extending at a tilt angle from horizontal in the range of approximately 10° through 90°, whereby upon cessation of fluid medium forced flow via said ducts, thus producing a fluid medium stagnation condition in said collector, the fluid medium trapped therein circulates in said collector and to and from said compartments via said always open passage means in response to solar incidence induced convection currents to produce a self-cooling action wherein heat is continuously transferred to external ambient from said outer compartment via said outer glazing means, said collector having only one of said outer and only one of said inner heating compartments, said outer and inner glazing means and said absorber means each consisting of a single layer of constituent material, the fluid medium flow cross section of said compartments being substantially uniform from one longitudinal end of the collector to the opposite longitudinal end of the collector, the forced flow path of said fluid medium being longitudinally through said outer compartment from said inlet duct and thence through said passage means into said inner compartment and thence longitudinally therein to said outlet duct.

8. A solar heat system utilizing a collector array comprising a plurality of solar heat collector modules and utilizing a forced flow gaseous heat transfer fluid medium, each said collector module having an overall lengthwise dimension at least about four times the width dimension of said collector, said collector module having an inner heating compartment defined by and extending between a reflective bottom surface extending substantially the length and width of said collector and a solar transmissive inner glazing means spaced from and extending parallel to said bottom surface, said collector module having an outer heating compartment defined by and extending between said inner glazing means and a solar transmissive outer glazing means spaced from and extending parallel to said inner glazing means on the side thereof remote from said inner compartment, an inlet duct for said fluid medium communicating with said outer compartment at given location longitudinally of said collector, passage means operable to effect fluid communication between said outer and inner compartments at a longitudinal end thereof remote from said inlet duct, an outlet duct for said fluid medium communicating with said inner compartment in the vicinity of said inlet duct longitudinally of said module, black body absorber means extending within said inner compartment parallel to said inner glazing means and said bottom surface and supported in said inner compartment such that said fluid medium can divide for flow lengthwise of said inner compartment along both sides of said absorber means, and support means connected to said collector module such that said module is oriented in operation for solar incidence transverse to the plane defined by the length and width dimensions of said module and with its lengthwise dimension extending generally horizontally, said module being oriented on said support means with its width dimension extending at an angle in the range of approximately 10° to and including 90° from horizontal and operable in stagnant mode to produce self-cooling in response to solar-induced internal convection currents between said compartments, said solar heat collector modules being arranged on said support means in longitudinal end-to-end relationship to form at least one horizontally extending row of said modules with those longitudinal ends of said modules which are disposed intermediate the opposite longitudinal ends of said array being interconnected for longitudinal flow of the fluid medium endwise successively from outer compartment to outer compartment of each module and likewise from inner compartment to inner compartment of each module in a reverse fold air flow pattern longitudinally of said array, said system further comprising an inventory of components made up in standard predetermined sizes for shipment as components to an on-site assembly location of said collector system, said components comprising horizontal framework members including sill beams, head beams and intermediate beams, vertical framework members including end jamb means, manifold jamb means and inner and outer vertical strut means, and solar transmission and absorber means including outer glazing panels, inner glazing panels and black body means adapted for suspension from the horizontal framework members, said modules being arranged in at least two of said horizontal rows comprising said one row and a second duplicate row laterally adjacent said one row, said intermediate beam means being disposed intermediate said rows and comprising a common wall therebetween, said sill, head and intermediate beams being end-abutted in respective rows extending horizontally of each modular collector row to define at least one side wall of an associated row, said beams each comprising an extruded beam having a generally I-shape cross-sectional configuration so as to have an upright center web with a bottom flange extending along its lower edge for securing said beam to a supporting surface, a top flange extending along its upper edge for supporting at least at one side of the web an associated outer glazing panel of the solar collector rows and at the opposite side of the web another upper glazing panel or a weather sealing flashing material, said web having an intermediate flange protruding laterally from each collector interior side thereof vertically between said top and bottom flanges, each said intermediate flange supporting an associated inner glazing panel of an associated row of said collector system.

9. A solar heat collector array comprising a plurality of solar heat collector modules for a solar heating system utilizing a forced flow gaseous heat transfer fluid medium, each said collector module having an overall lengthwise dimension at least about four times the width dimension of said module, each said collector module having an inner heating compartment defined by and extending between a reflective bottom surface extending substantially the length and width of said module and a solar transmissive inner glazing means spaced from and extending parallel to said bottom surface, said module having an outer heating compartment defined by and extending between said inner glazing means and a solar transmissive outer glazing means spaced from and extending parallel to said inner glazing means on the side thereof remote from said inner compartment, an inlet duct for said fluid medium communicating with said outer compartment at given location longitudinally of said collector, passage means operable to effect fluid communication between said outer and inner compartments at a longitudinal end thereof remote from said inlet duct, an outlet duct for said fluid medium communicating with said inner compartment in the vicinity of said inlet duct longitudinally of the module, black body absorber means extending within said inner compartment parallel to said inner glazing means and said bottom surface and supported in said inner compartment such that said fluid medium can divide for flow lengthwise of said inner compartment along both sides of said absorber means, and support means connected to each said collector module such that each said module is oriented in operation for solar incidence transverse to the plane defined by the length and width dimensions of said module and with its lengthwise dimension extending generally horizontally, said module being oriented on said support means with its width dimension extending at an angle in the range of approximately 10° to and including 90° from horizontal and operable in stagnant mode to produce self-cooling in response to solar-induced internal convection currents between said compartments, said collector modules being arranged on said support means in longitudinal end-to-end relationship to form at least one horizontally extending row of modules with those longitudinal ends of said modules which are disposed intermediate the opposite longitudinal ends of said array being interconnected for longitudinal flow of the fluid medium endwise successively from outer compartment to outer compartment of each module and likewise from inner compartment to inner compartment of each module in a reverse fold air flow pattern longitudinally of said array, said inlet and outlet duct being disposed centrally longitudinally of the collector array to provide a center feed of said fluid medium and constructed with the axis of each of said ducts perpendicular to the glazing plane of the associated row such that the inlet flow divides and flows horizontally in opposite directions through the interconnected outer compartments and then flows into the interconnected inner compartments via two of said passage means disposed one at each of the opposite longitudinal ends of said array, the flows from said passage means thence returning towards one another to said outlet duct via the interconnected inner compartments along said absorber means therein, said outer and inner glazing means each comprising a plurality of solar transparent lites arranged in an end-to-end tandem array with each pair of the mutually abutting longitudinal ends of the outer and inner glazing lites being respectively supported by exterior and interior struts extending widthwise of the collector, each of said exterior struts being offset longitudinally of the collector from an associated interior strut.

10. The solar collector construction set forth in claim 1 wherein said beams are each provided with an inwardly protruding, longitudinally extending black body mounting flange protruding from said center web between said intermediate and bottom flanges subjacent said intermediate flange and at an acute angle relative to said intermediate flange, and a plurality of spring clips interengaged between said black body and said beams, each of said spring clips having a return bent portion at one free end thereof yieldably engaged between the associated black body mounting flange and the adjacent intermediate flange.

11. The solar collector construction set forth in claims 1 or 10 wherein said black body comprises a single layer of metallic warp and woof elements woven into a thin, flexible open mesh screen having a natural, irregular, somewhat wavy contour and an open space area of approximately one seventh of the total area of said mesh screen, said screen being made up in long and narrow lengths and having a retainer clamp strip secured to each longitudinal edge thereof, said mesh screen being received along its associated edge within said strip and secured by a crimped relationship therewith.

12. The solar collector set forth in claim 10 wherein each of said spring clips is made of corrosion-resistance low thermal conductivity material such as stainless steel to provide tensioning and support for said black body while reducing heat transfer from said black body to said aluminum extrusion beams.

13. The solar collector construction set forth in claim 1 in which said inner and outer glazing lites consist of a plurality of glass panels disposed in end to end tandem relationship and wherein the juxtaposed end edges of tandem outer lites and tandem inner lites are spaced apart, the juxtaposed end edges of the inner lites being supported on an associated interior strut spanning the space between said head and sill beams, said inner strut resting at its ends upon the intermediate flanges of said beams and the juxtaposed end edges of said inner lites resting upon the associated inner strut, a cap extrusion secured to said inner strut and overlying said juxtaposed end edges of said inner lites to clamp the same against the associated inner strut, the juxtaposed end edges of said outer lites being supported on an associated exterior outer strut spanning between said head and sill beams, and a cap extrusion secured to said outer strut and overlying the juxtaposed end edges of said outer lites to clamp the same against said outer strut, the opposite ends of said outer struts resting upon a machined surface provided on the upper edge of the outer web of said head and sill beams.

14. The solar collector construction set forth in claim 1 or 10 wherein at least one intermediate beam is interposed in parallel relation with said head and sill beams to sub-divide said solar collector into an array of two modules extending lengthwise horizontally parallel to one another, said intermediate beam being similar in crosssectional configuration to said head and sill beams but further having an intermediate flange protruding from each lateral face of the web thereof to support a superposed inner lite glazing array one on each side thereof, said intermediate beam further having two hook flanges protruding respectively from opposite lateral faces of said web between said intermediate and top flanges so as to receive an associated retainer channel along each opposite lateral face of the web thereof.

15. The solar collector construction set forth in claim 1 further including cold air return inlet duct means comprising a flat panel disposed in tandem abutted relationship with said inner glazing lite array, said panel spanning between the mutually facing intermediate flanges of the associated beams, a duct member mounted through an opening in said panel and extending axially therefrom through the space between said inner lite array and the supporting surface for said collector construction for conducting return air into the space defined between the inner and outer glazing lite arrays.

16. The solar collector construction as set forth in claim 15 further including outlet duct means for communicating heated air from the space between said inner glazing lite array and the supporting surface, a reflective sheathing being disposed beneath said beams and jambs and above the supporting surface, said sheathing having an opening therethrough in the area adjacent said inlet duct means, said outlet duct means comprising a duct portion extending from the side of said sheathing facing said inner lites through the opening in said sheathing.

17. The solar collector construction set forth in claim 16 in combination with a support structure defining said supporting surface, and wherein said bottom flanges of said beams are provided with laterally spaced pairs of fastener openings therethrough with each pair being spaced longitudinally therealong from the other pairs, each of said openings comprising a slot extending longitudinally of said beams, and an associated fastener member individually received through each slot and interengaging the associated beam flange and said support structure, the pair of openings closest said duct means having the associated fasteners diagonally staggered relative to the slot pair so as to abut diagonally opposite ends of the slot pair to fix the beam in the vicinity of the duct means against longitudinal movement relative to the support structure, the remaining pairs of openings having their associated fasteners centered in the slots to thereby permit longitudinal relative sliding movement between the associated fastener and the flange to accommodate longitudinal thermal expansion and contraction of said beams relative to the supporting structure while retaining the portion of said beams in the vicinity of said duct means fixed against movement relative to said support structure.

18. The black body as set forth in claim 6 wherein said elements are made of aluminum.

19. The black body as set forth in claim 6 wherein said elements are made of stainless steel.

20. The black body set forth in claim 6 wherein said screen is made up in long and narrow lengths and has a retainer clamp strip secured to each longitudinal edge thereof, said strip having a generally box-like configuration made up of two spaced parallel sides connected by a bight portion, with one of said sides being slightly wider than the other and having an inturned flange adapted to overlap a flange turned inwardly from the outer edge of the other side, said mesh screen being received along its associated edge within the space defined inside said strip and secured by a crimped overlapping relationship of said inturned edge flanges of said parallel sides.

21. The black body as set forth in claim 2 wherein said one end of said clip has a barb protruding therefrom locking said one end inside said strip.

22. The black body as set forth in claim 21 wherein said spring clip comprises a generally U-shaped member comprising two spaced legs and a bight portion, said one end of said clip comprising the free end of one of said legs, the free end of the other of said legs having a return bent portion adapted for insertion into a retaining crevice of a support member.

23. The black body set forth in claim 6 wherein said screen has a surface to be exposed to incident solar radiation comprising a solar absorption material.

24. The black body set forth in claim 23 wherein said solar absorption material comprises a selective black absorptive surface.

25. The method as set forth in claim 4 comprising the further step of pre-installing glazing gasketing on the upper surfaces of the flange ledges of said beams and manifold jamb, on the upper surfaces of the inner and outer struts, and on the undersurfaces of the clamping strips and cap strips prior to installation of such framework members as set forth in claim 63.

26. The method as set forth in claim 4 wherein step 5 further comprises inserting the warm air duct through its associated roof aperture and thence into an aperture in the warm air return duct located on the side of the building support surface remote from the collector array, and then securing the outlet end of the warm air duct to the interior surface of the return duct by reaching through the warm air duct from its inlet end and bending radially outwardly an array of flange tabs from the outlet end of the duct so that such tabs overlap said interior surface.

27. The method set forth in claim 4 further comprising the steps of:
(14) prior to step 6 of claim 4, installing perimeter flashing to the building supporting surface so as to overlap the uppermost head beam and end jambs of the collector array along the upper outer flange ledges thereof so as to be subsequently clamped thereto by installation of said cap strips thereon during step 13 of claim 4, and
(15) after step 13 of claim 4, installing final perimeter flashing to the building supporting surface so as to overlap the upper outer flange ledge of the sill beam so as to be subsequently clamped thereto by the installation of the associated cap strip on said sill beam during step 13 of claim 4.

28. The collector set forth in claims 6, 7 or 8 wherein said glazing means consists of solar transparent glass lites, said framework members consist of aluminum extrusions and said black body absorber means consists of perforate material selected from the group consisting of aluminum and stainless steel.

29. The collector set forth in claim 28 wherein said glass lites are supported between weather seal strips running edgewise of each lite, said strips being made of resilient EPDM material.

30. The collector set forth in claim 29 wherein said framework members and struts are secured in interconnected relation, and said collector is mounted to a supporting structure with said bottom surface thereagainst, by corrosion resistant metallic fastener means.

31. The collector set forth in claim 3 wherein said vertical framework members are all supported on and carried by said horizontal framework members such that said vertical framework members are free of any fixed interconnection with said supporting structure and can move relative thereto with the associated portions of said horizontal framework members in response to thermally induced longitudinal expansion and contraction of said collector.

32. The collector set forth in claim 31 wherein each of said first and second fasteners has an associated plastic washer received on the fastener so as to be positioned between the head of said fasteners and the associated horizontal framework member, said washer being made of a material selected such that said washer provides a corrosion resistant, nonodoriferous heat resistant slide support for said horizontal framework members during said thermally induced expansion and contraction thereof.

33. The collector set forth in claim 7 wherein said outer heating compartment is sealed from said inner heating compartment such that substantially all flow communication for the heat transfer fluid medium between said compartments occurs only at one or both of the longitudinal ends of said compartments whereby substantially all of said medium must flow along the entire length of said outer and inner compartments during transit between the inlet and outlet ducts.

34. The collector system set forth in claim 3, 31 or 32 wherein said collector is oriented in operation for solar incidence transverse to the plane defined by the length and width dimensions of said collector and with its lengthwise dimension extending generally horizontally.

35. The collector set forth in claim 3 wherein said module is oriented in operation with its width dimension extending at an angle in the range of approximately 10° to and including 90° from horizontal.

36. A solar heat collector array comprising a plurality of solar heat collector modules as defined in claim 7 arranged on said support means in longitudinal end-to-end relationship to form at least one horizontally extending row of modules with those longitudinal ends of said modules which are disposed intermediate the opposite longitudinal ends of said array being interconnected for longitudinal flow of the fluid medium endwise successively from outer compartment to outer compartment of each module and likewise from inner compartment to inner compartment of each module in a reverse fold air flow pattern longitudinally of said array.

37. The collector array as set forth in claim 36 wherein said inlet and outet ducts are disposed centrally longitudinally of the collector array to provide a center feed of said fluid medium and constructed with the axis of each of said ducts perpendicular to the glazing plane of the associated row such that the inlet flow divides and flows horizontally in opposite directions through the interconnected outer compartments and then flows into the interconnected inner compartments via two of said passage means disposed one at each of the opposite longitudinal ends of said array, the flows from said passage means thence returning towards one another to said outlet duct via the interconnected inner compartments along said absorber means therein.

38. The collector array as set forth in claim 36 wherein said inlet and outlet ducts are disposed adjacent one of said opposite longitudinal ends of said array to provide an end feed of said fluid medium and constructed with the axis of said ducts perpendicular to the glazing plane of the associated row such that the inlet flow enters the longitudinally endmost area of said interconnected outer compartments and then flows longitudinally therethrough to the other of said opposite longitudinal ends of said array, said passage means being disposed adjacent said other opposite longitudinal end of said array whereby the flow from said passage means enters said interconnected inner compartments adjacent said other opposite longitudinal end of said array and thence flows longitudinally through said interconnected inner compartments along said absorber means therein to said outlet duct.

39. The modular collector array as set forth in claim 5 wherein each said modular collector of said array is oriented in operation with its width dimension extending at an angle in the range of approximately 10° to and including 90° from horizontal.

40. The collector array as set forth in claims 5 or 39 wherein said inlet and outlet ducts are disposed centrally longitudinally of the collector array to provide a center feed of said fluid medium and constructed such that the inlet flow divides and flows horizontally in opposite directions through the interconnected outer compartments and then flows into the interconnected inner compartments via two of said passage means.

41. The collector array as set forth in claims 5 or 39 wherein said trusses comprise roof supports of a building structure and said sheathing material comprises a layer of roof sheathing supported above as well as on said trusses and a layer of aluminum sheet sheathing superimposed on said layer of roof sheathing and defining said reflective bottom surface.

42. The solar collector construction set forth in claim 6 wherein said screen comprises a single layer of metallic warp and woof elements woven into a thin, flexible open mesh screen having a natural irregular, somewhat wavy contour, said screen being made up in long and narrow lengths and having a retainer clamp strip secured to each longitudinal edge thereof, and means suspending said screen via said clamp strip approximately in the middle of said inner compartment in generally parallel relation to said inner glazing means and said bottom surface.

43. The solar collector set forth in claim 42 wherein said suspension means comprises a series of spring clips made of corrosion-resistant low thermal conductivity material such as stainless steel to provide tensioning and support for said screen while reducing heat transfer from said screen via said clips.

44. The collector system as set forth in claim 8 further including on each of said beams a pair of longitudinally extending hook flanges spaced laterally from one another and protruding from each said collector interior side of said web in the space between said top and intermediate flanges adapted to individually receive in nested hooked relation the free end edges of a C-shaped retainer channel for holding down the associated inner glazing panel 45. The collector system as set forth in claim 44 further including on each of said beams a black body mounting flange extending along and protruding from each said collector interior side of said web between said intermediate and bottom flanges and at an acute angle adjacent said intermediate flange, each said mounting flange having a lip along its free edge and being adapted to capture in the space defined between said intermediate and mounting flanges a supension means for the associated black body absorber means of said solar collector.

46. The collector set forth in claims 6, 42 or 43 wherein said collector is oriented in operation for solar incidence transverse to the plane defined by the length and width dimensions of said collector and with its lengthwise dimension extending generally horizontally.

47. The collector set forth in claim 46 wherein said module is oriented in operation with its width dimension extending at an angle in the range of approximately 10° to and including 90° from horizontal.

48. The collector as set forth in claims 6, 42, 43 or 7 wherein said inlet and outlet ducts are disposed centrally longitudinally of the collector to provide a center feed of said fluid medium and constructed such that the inlet flow divides and flows horizontally in opposite directions through the outer compartment and then flows into the inner compartment via two of said gaps disposed one at each of the opposite longitudinal ends of said inner glazing means and an associated end wall of the collector, the flow from said gaps thence returning towards one another to the outlet duct via the inner compartment and said absorber means therein.

49. The black body as set forth in claim 32 wherein said warp elements comprise relatively narrow and thin flat strips and said woof elements comprise round wire, the maximum thickness of said elements being in the order of 0.011 inches.

50. The collector as set forth in claim 37 wherein said outer and inner glazing means each comprise a plurality of solar transparent lites arranged in an end-to-end tandem array with each pair of the mutually abutting longitudinal ends of the outer and inner glazing lites being respectively supported by exterior and interior struts extending widthwise of the collector, each of said exterior struts being offset longitudinally of the collector from an associated interior strut.

51. The modular solar heat collector system as set forth in claims 44, 45 or 8 wherein said sill, head and intermediate beams are provided in two nominal size lengths of 16 feet and 24 feet, said jambs and said vertical struts are provided in one nominal 4 foot length size, said inner and outer glazing panels all having the same width of nominally 4 feet and being provided in three length sizes of nominally 4 foot, 6 feet, and 8 feet, and including inlet air manifold duct weldments comprising a plate adapted to lay in tandem edge-to-edge abutment with the inner glazing array, said manifolds being provided in two sizes, one size having a nominal foot and a half width and the other size having a nominal three foot width, said two manifold sizes having the same length adapted to span between facing horizontal beams, the narrower width manifold serving as an end feed manifold and the wider manifold serving as a center feed manifold.

* * * * *